United States Patent [19]
Seguchi et al.

[11] Patent Number: 5,917,248
[45] Date of Patent: Jun. 29, 1999

[54] SYSTEM AND METHOD FOR DRIVING ELECTRIC VEHICLE

[75] Inventors: Masahiro Seguchi, Obu; Hiroaki Kajiura, Nagoya; Keiichiro Banzai, Toyota; Shinji Kouda; Kazuyoshi Obayashi, both of Kariya, all of Japan

[73] Assignee: Denso Corporation, Kariya, Japan

[21] Appl. No.: 08/847,609

[22] Filed: Apr. 25, 1997

Related U.S. Application Data

[63] Continuation-in-part of application No. 08/594,413, Jan. 31, 1996, abandoned.

[30] Foreign Application Priority Data

| Jan. 31, 1995 | [JP] | Japan | 7-13699 |
| Jan. 31, 1995 | [JP] | Japan | 7-13700 |
| Jun. 8, 1995 | [JP] | Japan | 7-141744 |
| Jun. 9, 1995 | [JP] | Japan | 7-142991 |
| Jun. 9, 1995 | [JP] | Japan | 7-142993 |
| Apr. 26, 1996 | [JP] | Japan | 8-107080 |
| Apr. 26, 1996 | [JP] | Japan | 8-107082 |
| Jun. 3, 1996 | [JP] | Japan | 8-140210 |
| Jul. 22, 1996 | [JP] | Japan | 8-192317 |
| Jul. 23, 1996 | [JP] | Japan | 8-193405 |
| Sep. 2, 1996 | [JP] | Japan | 8-232145 |
| Nov. 6, 1996 | [JP] | Japan | 8-293645 |

[51] Int. Cl.$^6$ .................................................. F02N 11/00
[52] U.S. Cl. ................................ 290/31; 290/36 R; 290/46; 310/113; 310/114; 322/16
[58] Field of Search ........................... 290/31, 36 R, 290/38 R, 46, 40 C; 322/16, 14, 40; 310/113, 114

[56] References Cited

U.S. PATENT DOCUMENTS

| 3,683,249 | 8/1972 | Shibata | 318/205 |
| 3,789,281 | 1/1974 | Shibata | 318/696 |
| 4,260,919 | 4/1981 | Fleming | 310/113 |
| 4,407,132 | 10/1983 | Kawakatsu et al. | 60/716 |
| 4,532,447 | 7/1985 | Cibie | 310/114 |
| 5,508,574 | 4/1996 | Vlock | 310/113 |
| 5,744,895 | 4/1998 | Seguchi et al. | 310/266 |
| 5,818,116 | 10/1998 | Nakae et al. | 290/38 R |

FOREIGN PATENT DOCUMENTS

| 58401/73 | 1/1975 | Australia . |
| 2 517 137 | 5/1983 | France . |
| 2 693 527 | 1/1994 | France . |
| 58-130704 | 8/1983 | Japan . |
| 60-1069 | 1/1985 | Japan . |
| 7-15805 | 1/1995 | Japan . |
| 2 278 242 | 11/1994 | United Kingdom . |
| 82/00928 | 3/1982 | WIPO . |

OTHER PUBLICATIONS

Electric Machine German Publication printed by Verlag Birkhaeuser in 1954, pp. 332–337.

*Primary Examiner*—Nestor Ramirez
*Assistant Examiner*—Nicholas Ponomarenko
*Attorney, Agent, or Firm*—Pillsbury Madison & Sutro LLP

[57] ABSTRACT

A T-S converter is composed of a first rotor which has a first control coil, a second rotor and a stator which has a second control coil. The second rotor has a first magnetic field member (such as permanent magnets) which supplies the first control coil with magnetic field and a second magnetic field member (such as permanent magnets) which supplies the second control coil with magnetic field. The first and second control coils are energized to drive the second rotor to rotate at a set speed with a set torque according to vehicle running condition. The first and the second control coil are also energized to generate battery charging current when the vehicle speed is decreased and the second rotor is driven by the vehicle wheels.

71 Claims, 36 Drawing Sheets

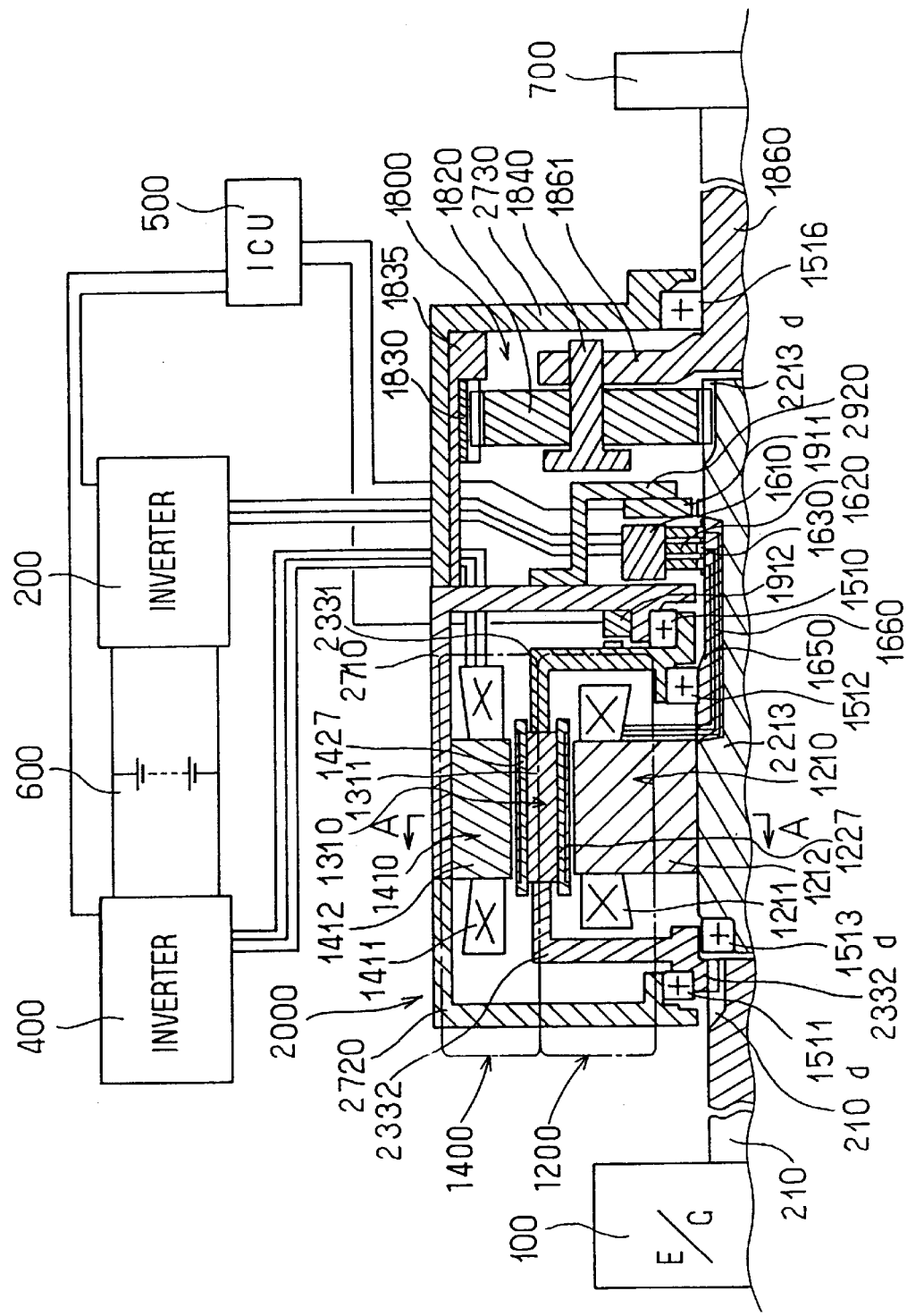

SYSTEM AND METHOD FOR DRIVING ELECTRIC VEHICLE

CROSS REFERENCE TO RELATED APPLICATION

The present application is a continuation in part of application Ser. No. 08/594,413, filed Jan. 31, 1996 now abandoned.

BACKGROUND OF THE INVENTION

1. Field of the Invention

The present invention relates to a system and method for driving an electric vehicle and, more particularly, relates to a hybrid-type electric-vehicle-driving system with electric power generated by an internal combustion engine.

2. Description of Related Art

Japanese Patent Laid-Open Sho 60-1069 discloses a hybrid-type electric-vehicle-driving system with electric power generated from an internal combustion engine. Such an electric-vehicle-driving system is composed of a generator which is mechanically connected to a drive shaft of an internal combustion engine, an electric motor for driving vehicle wheels, battery unit for storing electric power of the generator and energizing the electric motor and a control unit for regenerating electric power by the electric motor when the vehicle speed is reduced.

However, since all the driving power of the above conventional system is applied to the wheels through electric power system including the generator, the battery unit and the motor, the power system is necessarily required to have a large size. In addition, since the energy conversion is made a plurality of times, the total efficiency of the system is not so high.

Japanese Patent Laid-Open Sho 58-130704 discloses a torque-speed converting system, in which engine power is converted into electromagnetic induction force and transmitted to the vehicle wheels by a wheel-drive motor having control coils and, as required, electric power is supplied from a battery to the wheel-drive motor, or kinetic energy of the vehicle is converted by the wheel-drive motor (functions as a generator) to electric power to be stored into a gyro wheel.

However, since the frequency of the induction current applied to the control coils (short-circuited coils) of the drive-motor is proportional to the engine rotational speed and can not be changed, it is not possible to control the rotational speed of the vehicle wheels although the torque can be changed.

SUMMARY OF THE INVENTION

In view of the above described circumstances, it is a primary object of the present invention to provide an improved system and method for driving an electric vehicle in which a portion of the engine power is transmitted directly to the wheels with the remainder converted into electric power so that both torque and rotational speed of the wheels can be changed, thereby increasing efficiency of the system.

Another object of the present invention is to provide a system for driving an electric vehicle which comprises an improved torque-speed converter (hereinafter referred to as T-S converter) composed of a first rotor having a first control coil, a stator having a second control coil, a second rotor having first and second members for generating magnetic field interlinking respectively the first and second control coils. The system further comprises rotation sensor for detecting rotation of the first rotor and the second rotor and means for supplying the first and second control coils with control electric current according to the rotation of the first and second rotors so that the T-S converter converts rotational speed and torque of the engine into a set rotational speed and a set torque of the vehicle drive member.

Another object of the present invention is to provide a system for driving an electric vehicle wherein the T-S converter further comprises a speed reduction means. The speed reduction means may comprise planetary-gears.

Another object of the present invention is to provide a system for driving an electric vehicle wherein the control current supplying means controls the engine to operate as a brake member when the vehicle drive member drives the output shaft.

Another object of the present invention is to provide a system for driving an electric vehicle wherein the first rotor, the second rotor and the stator are disposed coaxially with each other.

Another object of the present invention is to provide a system for driving an electric vehicle wherein at least one of the first and second members are permanent magnets. The remainder may be a squirrel cage conductor.

Another object of the invention is to provide a system for driving an electric vehicle which comprises a compact first rotor which has a coolant supplying means. The first rotor has cooling passages formed in the magnetic core.

A further object of the present invention is to provide a method for driving an electric vehicle which comprises steps of calculating a set torque Tv and set angular speed $\omega v$ of a vehicle drive member, detecting output torque Te and angular speed $\omega e$ of the engine, supplying the first and second control coils with control electric current according to differences between the torques Tv and Te and between the angular speeds $\omega v$ and $\omega e$ thereby to convert torque Te and angular speed $\omega e$ of the engine into the set torque Tv and set angular speed of the vehicle drive member.

A current control step can be added to generate battery charging current when the angular speed $\omega e$ of the engine is higher than the set angular speed $\omega v$ and the output torque Te of the engine is larger than the set torque Tv.

Another current control step can be added to generate driving torque when the angular speed $\omega e$ of the engine is lower than the set angular speed $\omega v$ and the output torque Te of the engine is lower than the set torque Tv.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 7 is a schematic cross-sectional side view illustrating a system according to a fourth embodiment of the present invention;

DETAILED DESCRIPTION OF THE PREFERRED EMBODIMENT

First Embodiment

Figure 1:
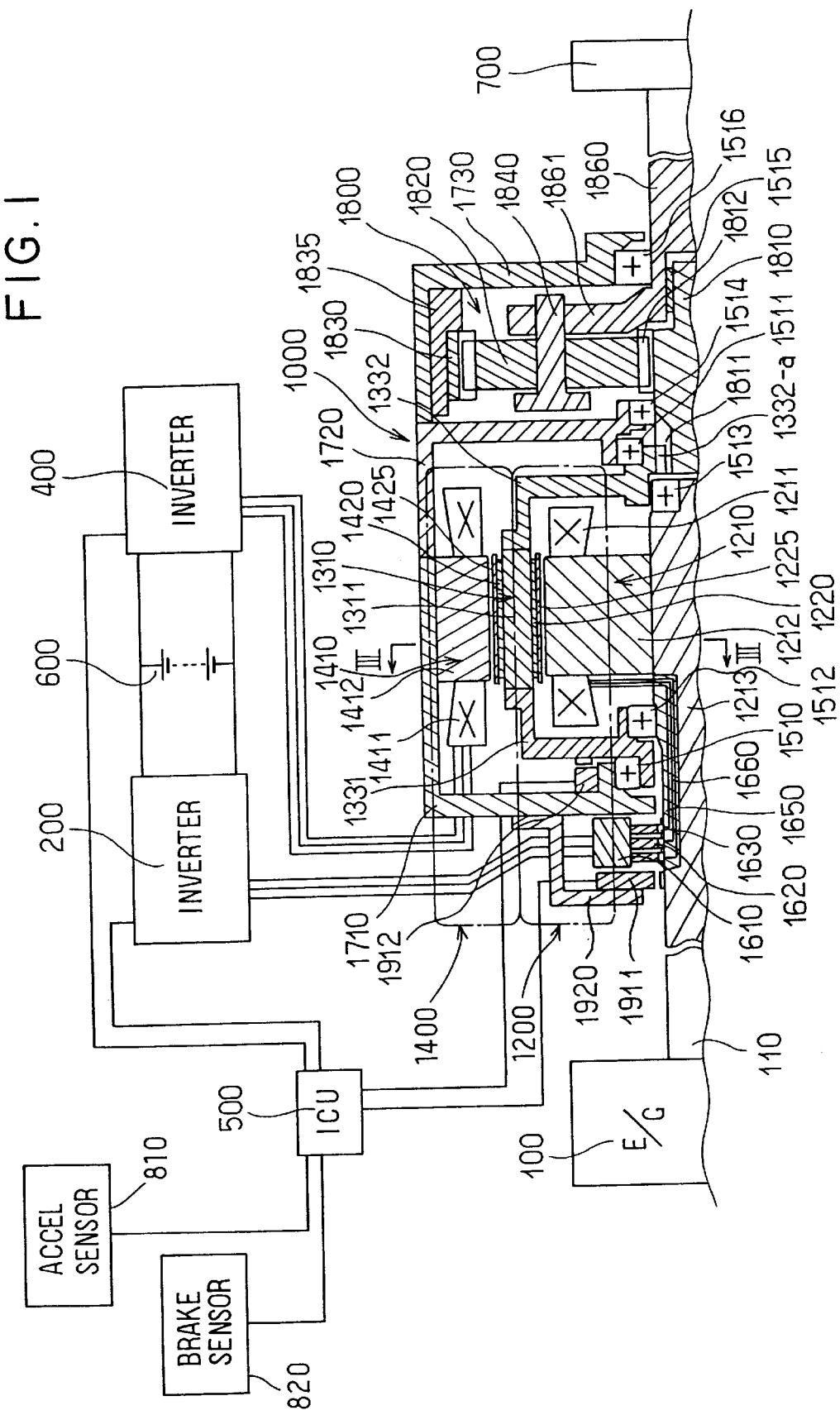
FIG. 1 is a schematic cross-sectional side view illustrating a system according to a first embodiment of the present invention.

A system for driving an electric vehicle according to a first embodiment of the present invention is described with reference to FIG. 1.

A torque-rotational speed converter 1000 (T-S converter) is a driving unit which is driven by an engine 100 to drive vehicle wheels 700 at driving torque and rotational speed controlled according to vehicle driving conditions. The T-S converter is composed of a speed control section 1200 which is a synchronous motor structure to be described later, a torque control section 1400 which is another synchronous motor structure to be described later and a speed reduction section 1800. An inverter 200 has power switching transistors (not shown) therein and converts the DC-current supplied from a battery 600 into three phase AC current, which is supplied to the speed control section 1200 of the T-S converter. The inverter 200 also converts AC current generated by the speed control section 1200 into DC current to charge the battery 600 when the speed control section 1200 is driven by the vehicle wheels 700. An inverter 400 also converts DC current into AC current and AC current into DC current between the battery 600 and the torque control section 1400 of the T-S converter 1000 in the same manner as the inverter 200. An inverter control unit 500 controls the inverters 200 and 400 according to signals transmitted from an accelerator sensor 810, a brake pedal sensor 820, rotation sensors 1911 and 1912 (to be described later) and other sensors. Joint members and speed reduction mechanisms, which are used in the ordinary vehicle, may be disposed between the engine 100 and the T-S converter 1000, and also between the T-S converter 1000 and the wheels 700. An engine shaft 110 of the engine 100 is connected to an input shaft 1213 of the T-S converter 1000 through a coupling (not shown).

The T-S converter 1000 is composed of a pair of cylindrical outer frames 1710 and 1720, a cylindrical first rotor 1210 which is carried by the input shaft 1213, a second rotor 1310 which is rotatably disposed around the first rotor 1210 at a gap and a stator 1410 fixed to an inner periphery of the outer frame 1710. The input shaft 1213 extends from the center of an end of the outer frame 1710 and is connected with the engine shaft 110. The stator 1410 has a stator core and a control coil 1411 which generates a rotating magnetic field when energized by the inverter 400. The first rotor 1210 has a rotor core 1212 and a control coil 1211 which forms a rotating magnetic field. A brush holder 1610, three brushes 1620 and three slip rings 1630 are disposed in a cover case 1920 to supply three phase electric power to the control coil 1211 of the first rotor 1210. Shaft supporting members such as bearings 1510 and 1511 are fixed to the driven shaft 1213. The control coil 1211 and the slip ring 1630 are connected by lead wires 1660 passing under the bearing 1512 with an insulating member 1650. The insulating member 1650 is inserted in a groove formed in the input shaft 1213 so as to go under the bearing 1512. The second rotor 1310 has a hollow rotary yoke 1311 and a plurality of internal permanent magnets 1220 are fixed to the inner periphery thereof by a ring 1225 at an equal interval to provide N and S poles alternately. The hollow rotary yoke 1311 is supported by the outer frames 1710 and 1720 via rotor frames 1331 and 1332 and bearings 1510 and 1511. The input shaft 1213 is rotatably supported by the rotor frames 1331 and 1332 via bearings 1512 and 1513. The permanent magnets 1220, the rotor core 1212 and the control coil 1211 compose a synchronous motor which corresponds to the aforementioned speed control section 1200. The second rotor 1310 also has a plurality of external permanent magnets 1420 fixed to the outer periphery of the hollow rotary yoke 1311 by a ring 1425 at an equal interval to provide N and S poles alternately. The permanent magnets 1420, the stator core 1412 and the control coil 1411 compose a synchronous motor which corresponds to the aforementioned torque control section 1400. The rotation sensors 1911 and 1912 are disposed respectively in the cover case 1920 and in a space between a rotor frame 1331 of the second rotor 1310 and the outer frame 1710. The sensor 1911 and 1912 are connected to the inverter control unit 500 to control rotational speed and torque of the first and second rotors 1210 and 1310 as described later.

The speed reduction Section 1800 of the T-S converter 1000 has a sun gear shaft 1810, a planetary gear 1820, an internal gear 1830, a planetary gear shaft 1840 and an output shaft 1860. An input gear 1811 is formed on an end of the sun gear shaft 1810 in mesh with an internal gear 1332a of a boss portion of the rotor frame 1332. The sun gear shaft 1810 is rotatably supported by the outer frame 1720 and the output shaft 1860 respectively via bearings 1514 and 1515. The rotation is transmitted from the second rotor 1310 to the output shaft 1860 through the sun gear shaft 1810, a sun gear 1812 formed around the sun gear shaft 1810 in mesh with the planetary gear 1820. The rotational speed is reduced by the internal gear 1830 and the planetary gear shaft 1840, and is transmitted to a planetary gear carrier portion 1861 formed integrally with the output shaft 1860. The output shaft 1860 is rotatably supported by a bearing 1516 which is fitted to a boss portion of a frame 1730 of the speed reduction section 1800. The sun gear shaft 1810 and the output shaft 1860 are disposed in line with the input shaft 1213. The internal gear 1830 is fixed to the frame 1730 of the reduction section 1800 via a fixing member 1835.

Figure 8:
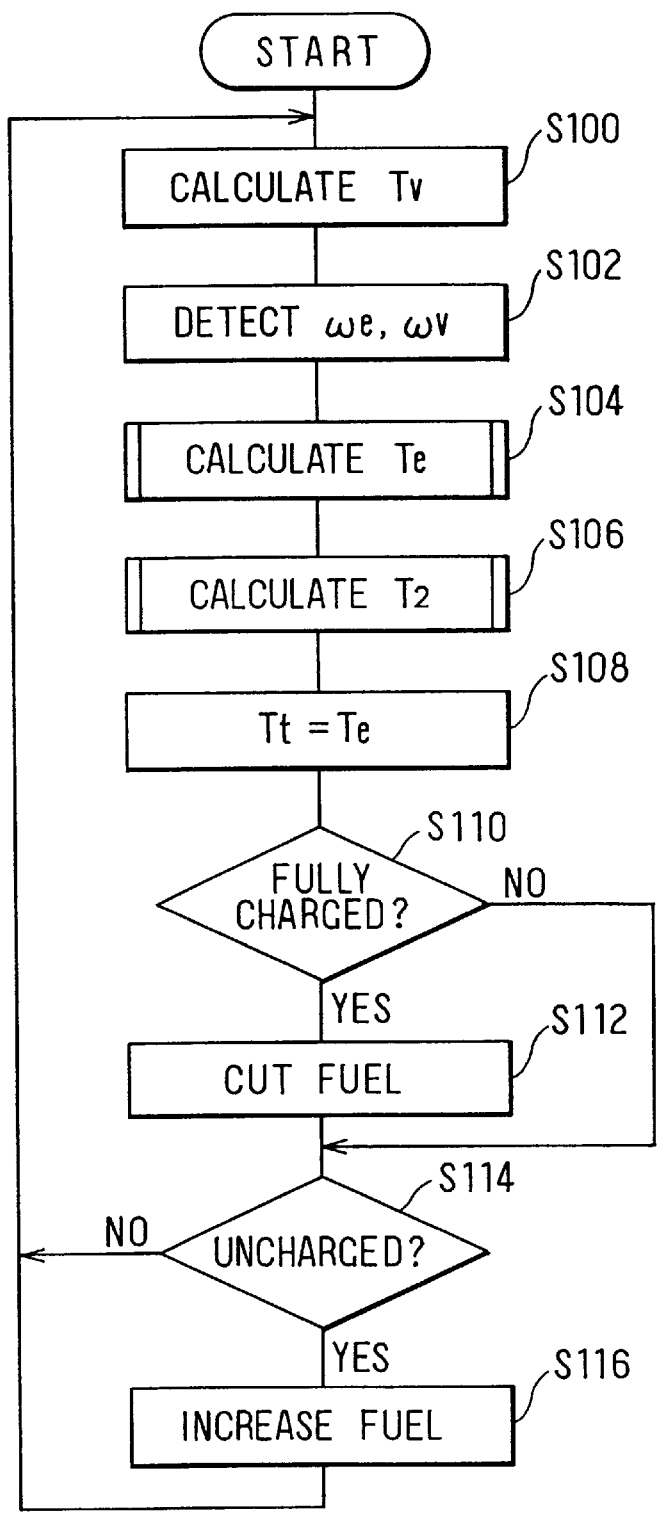
FIG. 8 is a flow chart of steps for controlling a system according to the present invention.

Operation of the T-S converter 1000 is described with reference to a flow chart shown in FIG. 8.

When the inverter control unit 500 is started, a set-torque Tv for the vehicle wheels 700 is determined according to a signal representing the throttle-open-angle detected by the accelerator sensor 810 and a signal representing brake-pedal-operation detected by the brake pedal sensor 820 in a step S100. Then, angular speeds ωe of the first rotor 1210 and ωv of the second rotor 1310 are determined according to signals from the rotation sensors 1911 and 1912 in a step S102. Subsequently, engine torque Te generated by the engine 100 is calculated from the throttle-open-angle signal and the angular speed signal ωv on the basis of a data map of the inverter control unit 500 (step S104). Transmitting torque Tt which is transmitted between the first rotor 1210 and the second rotor 1310 is determined in the following step. The transmitting torque Tt is set to be equal to the engine torque Te. That is, no addition to or reduction from the engine torque Te is made between the first and second rotors 1210 and 1310 except a slight torque change in order to maintain the drive-stability of the vehicle. In order to eliminate the slight torque change between the first and second rotors 1210 and 1310, rotational speed of the second rotor 1310 is controlled by the inverter 200.

Then toque T2 for the torque control section 1400 to supplement difference between the transmitting torque Tt and the set torque Tv is determined in a step S106. That is, the relationship of the torque is expressed as T2=Tv−Tt=Tv−Te. Subsequently, the inverter 400 controls the torque control section 1400 to generate the supplemental torque T2 in a step S108.

Figure 9:
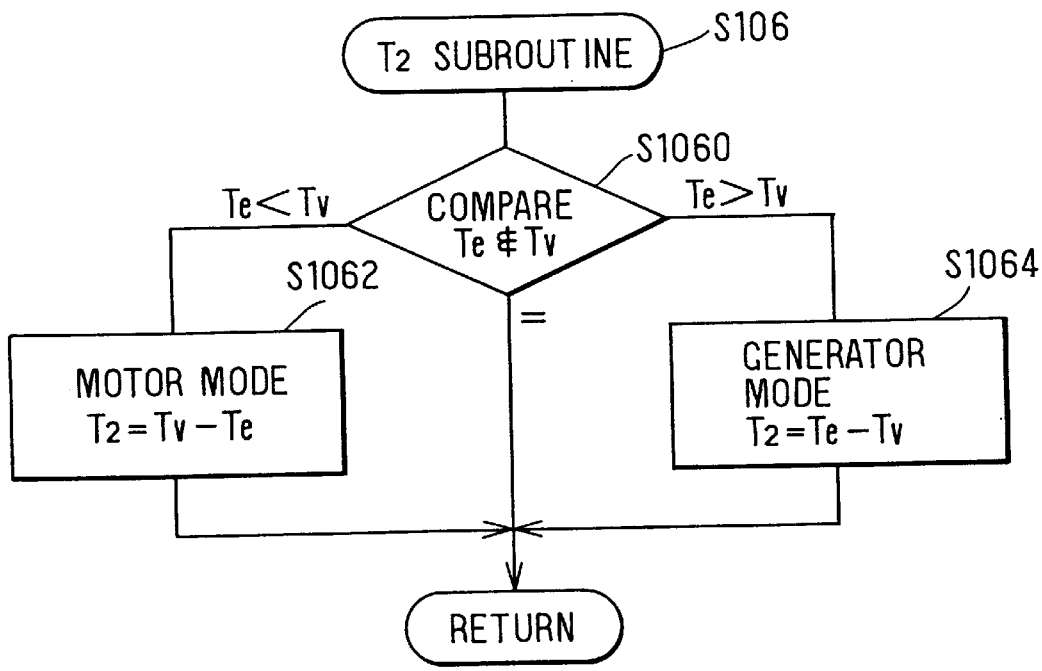
FIG. 9 is a flow chart of a sub-routine of a step in the flow chart shown in FIG. 8.

The torque control section 1400 operates as a generator or a motor according to a difference between the engine torque Te and the set torque Tv in the step S 106 as shown in FIG. 9.

When the engine torque Te is found to be smaller than the set torque Te in a step 1060, the process goes to a step 1062 where the torque control section 1400 is controlled to become a wheel-drive motor which generates the torque T2=Tv−Te with power supplied from the inverter 400. If the engine torque Te is larger than the set torque Tv on the other hand, the process goes to a step S1064, where the torque control section 1400 is controlled to become a generator which is driven by the torque T2=Te−Tv. If the engine torque Te is equal to the set torque Tv, the torque control section 1400 does not function as a motor or a generator.

Figure 10:
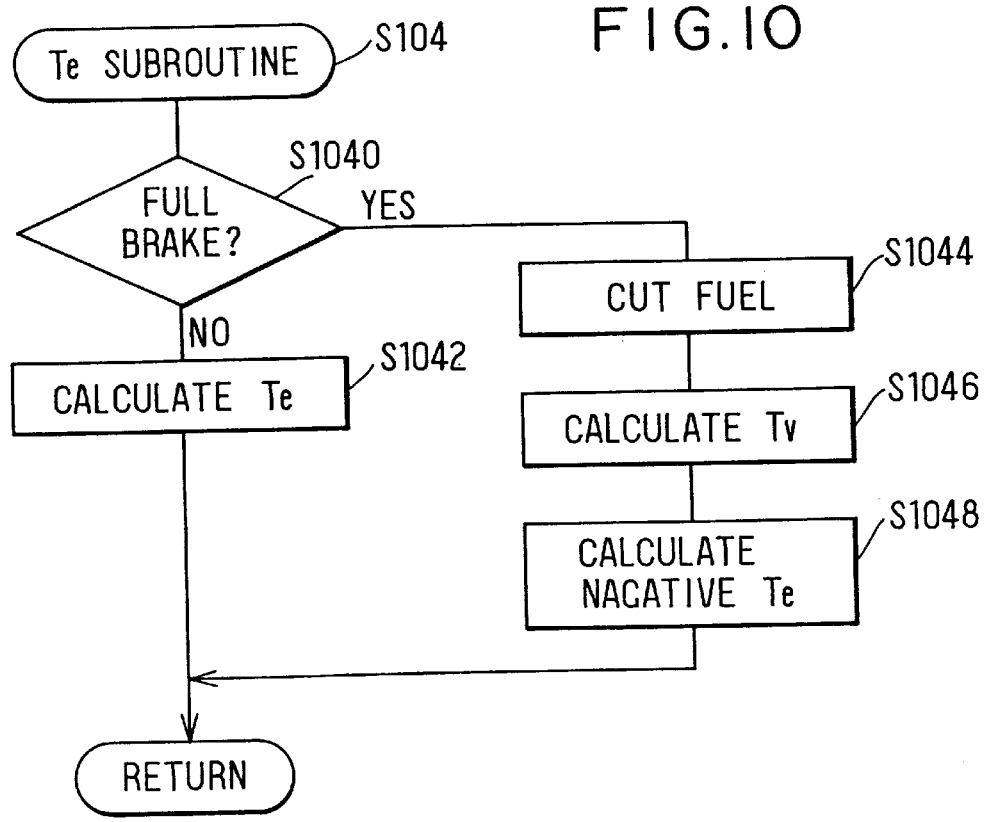
FIG. 10 is a flow chart of a sub-routine of a step in the flow chart shown in FIG. 8.

The engine torque Te may be calculated from the brake-pedal-operation signal transmitted from the brake pedal sensor 820 as shown in FIG. 10. When the vehicle is driven on a steep slope and the brake pedal is operated to a degree more than a predetermined degree, fuel supply to the engine is stopped thereby to stop driving the first rotor 1210 in a step S1044. Then, the set torque Tv is calculated only from the brake pedal signal in a step S1046, and a negative value of the engine torque Tv at an angular speed ωe is calculated in a step S1048 so that the inverter 400 controls the torque control section 1400 to operate as a regenerative brake.

When the brake pedal is determined to operate within the predetermined degree in the step S1040 on the other hand, the torque Te is calculated in the ordinary manner from the throttle-open-angle signal, the angular speed ωe and etc. in a step S1042. Then, charging state of battery 600 is detected by a well-known manner (for example, by calculating from battery voltage and charging current) in a step S110 in FIG. 8. If the charging ratio is higher than a maximum value, the control of the first rotor by the inverter 200 is stopped and only the control by the torque control section 1400 is permitted. At this time, the fuel supply to the engine 100 is cut or reduced in a step S112. Then, the process returns to the step S100 if the charging ratio is found to be not lower than a minimum value in a step S114. When the battery charging ratio is not higher than the maximum value on the other hand, the process goes to a step S114, and to a step S116 if the battery charging ratio is lower than the minimum value. The process returns to the step S100 after the fuel supply to the engine 100 is increased in the step S116.

The transmitting torque Tt is controlled to substantially equal to the engine torque Te by the speed control section 1200 according to the above embodiment. However, it is possible to control the second rotor 1310 to rotate at a speed higher than the first rotor 1210, while the torque is maintained constant. That is, the frequency of the AC current supplied by the inverter 400 to the stator 1410 is increased to corresponds to the rotational speed of the second rotor and the frequency of the AC current supplied by the inverter 200 to the second rotor 1310 is controlled to correspond to a difference between the rotational speeds of the first rotor 1210 and the second rotor 1310.

Operation of the T-S converter 1000 when the engine rotates at a speed 2n [rpm] with a torque t [N·m] and the vehicle runs at a speed n [rpm] with a torque 2t [N·m] is described with reference to FIG. 1, FIGS. 2A through 2D and FIG. 3. The speed and the torque of the engine and the vehicle wheels are treated here as if the engine and the wheel were connected directly in order to make the discussion simple.

Since the second rotor 1310 is mechanically connected to the output shaft 1860 via the reduction section 1800, the rotational speed of the second rotor 1310 must be controlled by the speed control section 1200 to correspond to the vehicle speed.

Figure 2A:
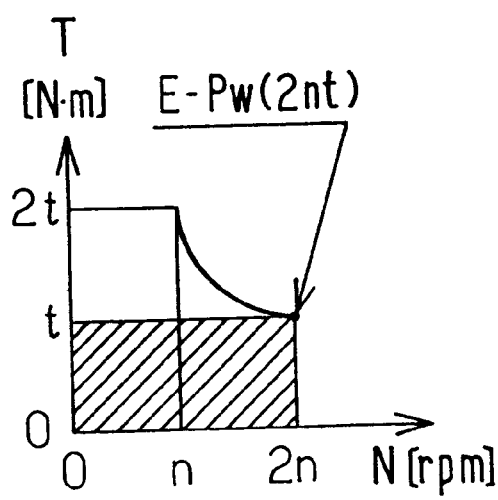
FIGS. 2A, 2B, 2C and 2D are graphs showing how the system according to the first embodiment converts torque and rotational speed of the engine into set torque and rotational speed of the vehicle.

The engine rotation at the speed 2n [rpm] with the torque t [N·m] shown in FIG. 2A is transmitted to the input shaft 1213 of the T-S converter 1000 through a coupling (not shown), and to the first rotor 1210. The rotational speed 2n [rpm] of the second rotor 1310 is reduced to n [rpm] by induction force or electromagnetic force of the speed control section 1200 and transmitted to the vehicle wheels 700 as shown in FIG. 2B.

Figure 2B:
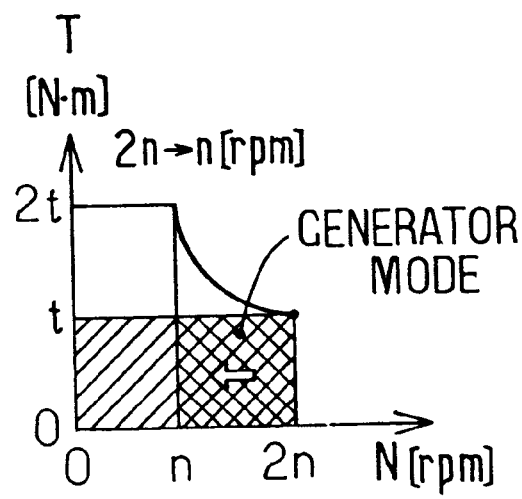
Figure 2C:
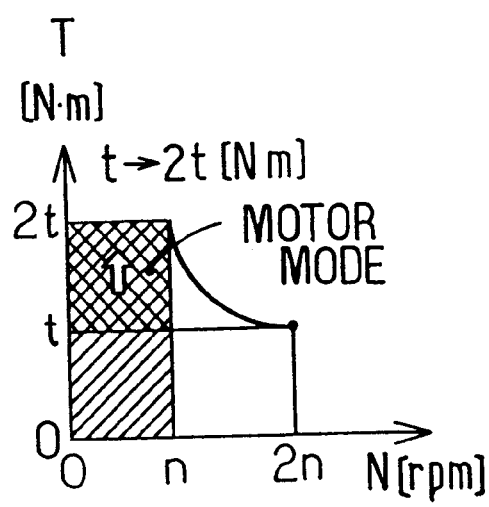
Figure 3:
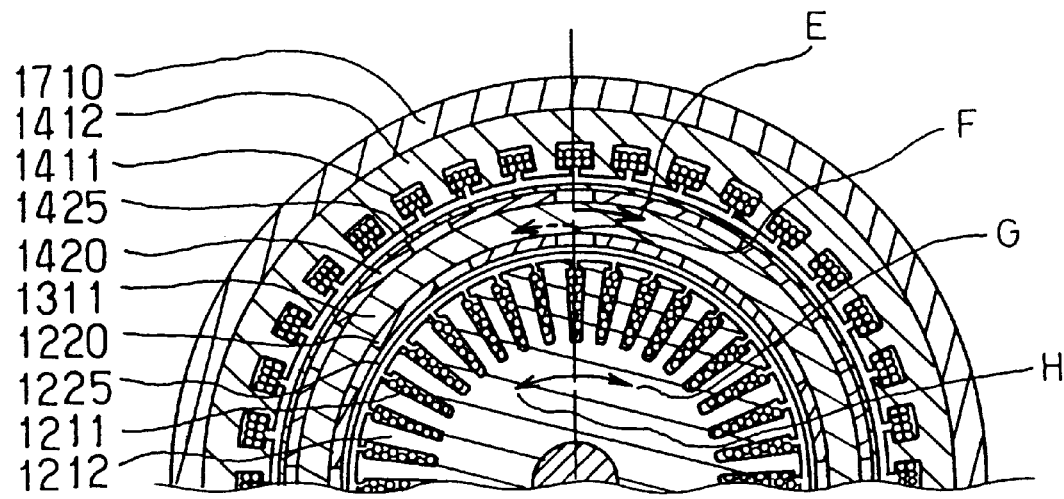
FIG. 3 is a cross-sectional schematic view illustrating a main portion of a T-S converter of the system cut along a line III—III in FIG. 1.

In order to change the speed of the second rotor 1310 from 2n [rpm] to n [rpm] while maintaining the same torque t as shown in FIG. 2B, the direction F of the rotation of the second rotor 1310 relative to the first rotor 1210 becomes opposite to the direction E of the torque of the second rotor as shown in FIG. 3. (Incidentally, an arrow G indicates the direction of the engine torque, and an arrow H indicates the direction of the torque from the vehicle wheels.) The speed control section of the T-S converter 1000 operates in the generating mode at this moment. The rotation of the second rotor 1310 relative to the first rotor 1210 is detected by the rotation sensors 1911 and 1912 and the control coil 1211 of the first rotor 1210 is energized at timing calculated on the basis of the relative rotation. The power generated in the control coil 1211 of the first rotor 1210 is supplied to the battery 600 and to the torque control section 1400 through the slip rings 1630, the brushes 1620. Thus, the second rotor 1310 rotates the output shaft 1860 at the speed n [rpm] with the torque t [N·m] to generate energy nt [N·m][rpm] as indicated by cross hatching in FIG. 2B. In other words, the T-S converter 1000 can transmit the driving torque t of the engine to the vehicle wheels 700 without change and generates electric power by the difference in the rotation between the engine 100 and the vehicle wheels 700.

Then, the inverter 400 supplies the stator control coil 1411 of the torque control section 1400 with AC control current at timing calculated from the signal of th e rotation sensor 1912 so that the second rotor 1310 can rotate at the speed n [rpm] with the torque 2t [N·m]. That is, the torque control section 1400 is energized by the inverter 400 to generate an additional torque t as a motor as indicated by cross-hatching in FIG. 2C. The rotation of the second rotor 1310 is transmitted through the internal gear 1332a of the rotor frame 1332, the input gear 1811 and the reduction section 1800 to the output shaft 1860.

Figure 2D:
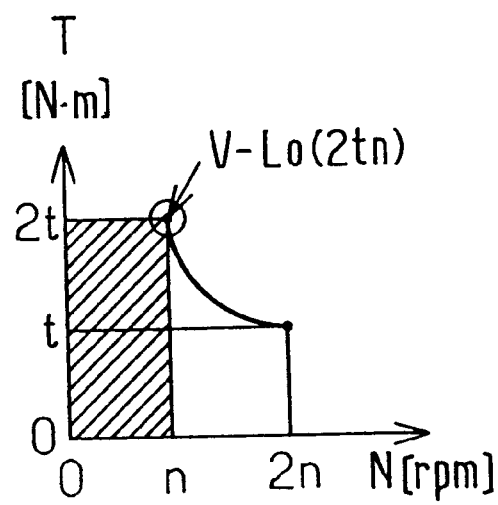

Thus, the power of the engine which rotates at a speed 2n [rpm] with a torque t [N·m] as shown in FIG. 2A can be applied to the vehicle runs at a speed n [rpm] with a torque 2t [N·m] as shown in FIG. 2D.

The speed control section 1200 can operates as a motor for driving the vehicle wheel if the vehicle requires speed higher than the speed of the engine 100. The torque control section 1400 can operate as a generator for charging battery if the engine torque exceeds torque required by the vehicle.

The convection of the torque and speed between the engine and the vehicle wheel can be carried out also when the power of the engine and load of the vehicle wheel is different in the same manner as described above. For example, when the vehicle runs on a steep uphill slope, the control unit 500 controls the inverters 200 and 400 to supply electric power to the control coils 1211 and 1411 thereby to assist the engine to drive the vehicle wheels as required. On the other hand, when the vehicle runs on a steep down hill, the control unit 500 controls the inverter 200 and 400 to charge electric power generated by the control coils 1211 and 1411 to the battery.

When the vehicle needs further slow down, the speed control section 1200 connects the wheel to the engine 100 as a brake or a compressor. Thus, torque control section 1400 is not required to have large braking power, resulting in a compact size.

Second Embodiment

A system for driving an electric vehicle according to a second embodiment is described with reference to FIG. 4.

The same reference numeral indicates the same or substantially the same part or portion hereinafter and, therefore, detailed description is omitted from descriptions of the following embodiments.

The second rotor 1310 according to the second embodiment has squirrel-cage-conductors 1227 and 1427 instead of the permanent magnets. Accordingly, the second rotor 1310 operates as an induction motor instead of a synchronous motor in the first embodiment.

Figure 4:
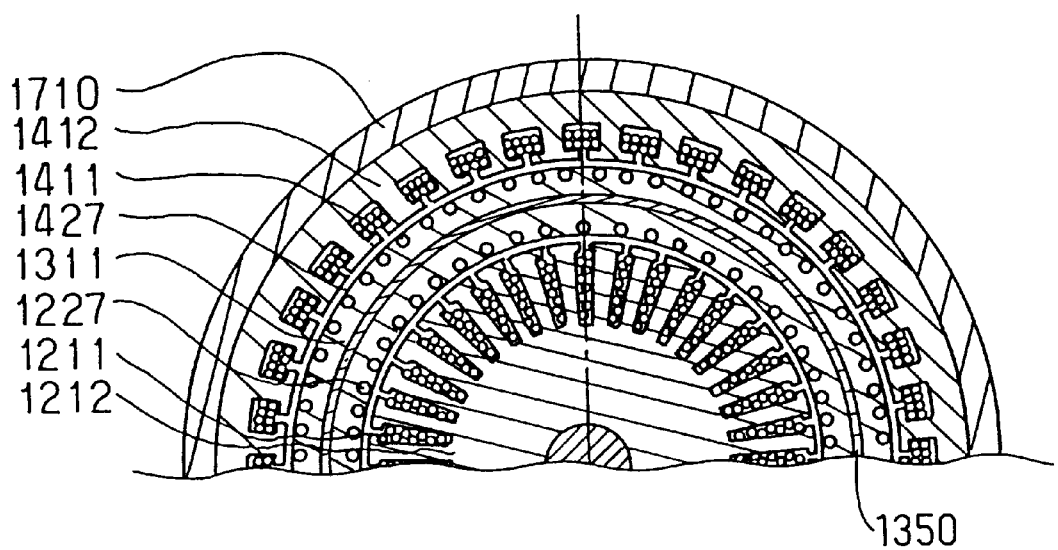
FIG. 4 is a cross-sectional plan view illustrating a main portion of a T-S converter of the system according to the second embodiment.

A cylindrical non-magnetic layer 1350 is disposed between the squirrel-cage-conductors in order to prevent magnetic interference between the speed control section 1200 and the torque control section 1400, as shown in FIG. 4 which is a cross-sectional view illustrating a main portion of the T-S converter 1000.

Since the T-S converter according to the second embodiment is composed of the induction type second rotor 1310, the rotation sensors 1911 and 1912 can be replaced with a crank angle sensor or vehicle speed sensor disposed near the vehicle wheel.

Either one of the squirrel-cage conductors 1227 and 1427 of the second rotor 1310 can be replaced with the permanent magnets as described with regard to the first embodiment.

Third Embodiment

A T-S converter 2000 according to a third embodiment is described with reference to FIG. 5 and FIGS. 6A, 6B, 6C and 6D.

A gear 210d is formed on the end of an output shaft 210 of the engine 100 to be in mesh with an internal gear 2332d formed in a frame 2332 of the second rotor 1310 so that the engine power is transmitted to the second rotor 1310 directly. The first rotor 1210 is carried by a shaft 2213 which is disposed in alignment with, but separate from, the engine output shaft. A sun gear 2213d of the speed reduction section 1800 is formed at an end of the shaft 2213 opposite the engine 100.

Driving power is transmitted from the first rotor 1210 through the gear 2213d to the planetary gear 1820. Then, after the rotational speed of the planetary gear 1820 is reduced by the internal gear 1830, the driving power is transmitted through the planetary gear shaft 1840 and the planetary carrier 1861 to the output shaft 1860. The output shaft 1860 is rotatably supported by the bearing 1516 which is fitted to a boss portion of a frame 2730 of the speed reduction section 1800. The internal gear 1830 is fixed to the frame 2730 via the fixing member 1835. The cover case 1920, the rotation sensors 1911 and brush holder 1610 are disposed in the frame 2730 together with the reduction section 1800.

Operation of the T-S converter 2000 is described with reference to FIG. 5, FIGS. 6A through 6D and FIG. 7.

Figure 6A:
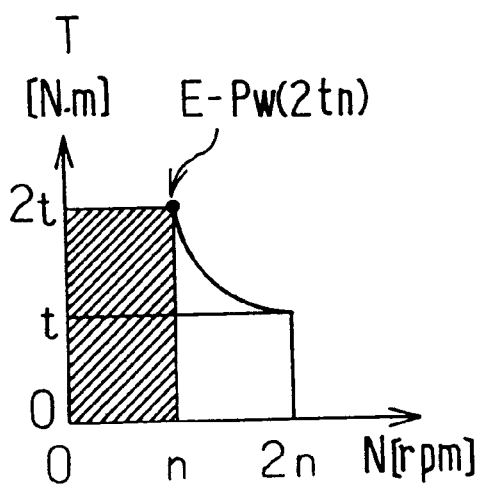
FIGS. 6A, 6B, 6C and 6D are graphs showing how the system according to the third embodiment converts torque and rotational speed of the engine into set torque and rotational speed of the vehicle.
Figure 6B:
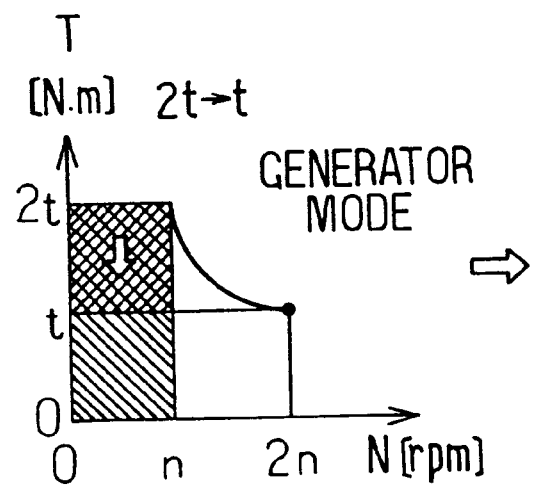
Figure 6C:
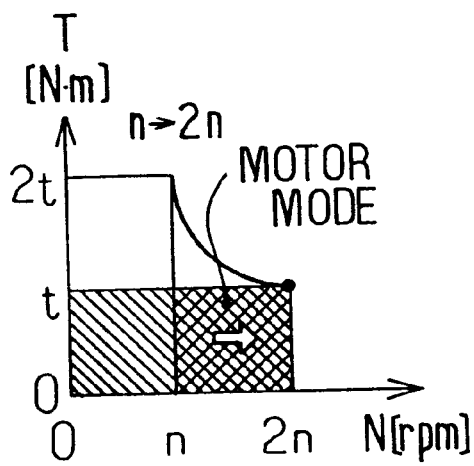
Figure 6D:
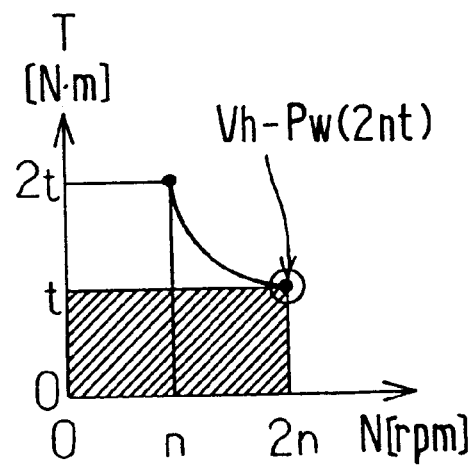

When the engine 100 rotates at a speed n [rpm] with a torque 2t [N·m] as shown in FIG. 6A and the vehicle runs at a speed 2n [rpm] with a torque t [N·m] as shown in FIG. 6D, the engine rotation is transmitted from the output shaft 210 and a coupling (not shown) through the internal gear 2332d to the second rotor 1310. The inverter 400 supplies the stator control coil 1411 of the torque control section 1400 with AC control current at timing calculated from the signal of the rotation sensor 1912 so that the second rotor 1310 can rotate at the speed n [rpm] with the torque t [N·m]. That is, the torque control section 1400 changes the torque 2t [N·m] transmitted from the engine 100 to t [N·m] as shown in FIG. 6b while maintaining the speed n [rpm] and generates electric power which corresponds to tn [Nm][rpm]. The generated power is supplied from the control coil 1411 to the battery 600 through the inverter 400.

Then, the torque t of the second rotor 1310 is transmitted to the first rotor 1210 of the speed control section 1200 through the permanent magnets 1220 disposed on the inner periphery of the second rotor 1310.

The rotational speed n [rpm] of the first rotor 1210 is changed to 2n [rpm] by induction force or electromagnetic force of the speed control section 1200 to correspond to the vehicle speed and transmitted to the vehicle wheel 1310 as shown in FIG. 6C. When the speed of the second rotor 1310 is changed from n [rpm] to 2n [rpm] while maintaining the same torque t as shown in FIG. 6C, the direction of the rotation of the first rotor is the same as the direction of the rotation of the second rotor 1310 and, therefore, the T-S converter 2000 operates in the motor mode. The rotation of the first rotor 1210 relative to the second rotor 1310 is detected by the rotation sensors 1911 and 1912 to energize the control coil 1211 of the first rotor 1210 at timing calculated on the basis of the relative rotation, and electric power is supplied to the speed control section 1200 by the inverter 200. The first rotor 1210 rotates at the speed 2n [rpm] with the torque t [N·m] by consuming energy nt [N·m][rpm] of the battery as indicated by cross hatching in FIG. 6C.

Thus, the power of the engine which rotates at a speed n [rpm] with a torque 2t [N·m] as shown in FIG. 6A can be applied to the vehicle which runs at a speed 2n [rpm] with a torque t [N·m] as shown in FIG. 6D.

The speed control section 1200 can operate as a motor when the engine speed is higher than the vehicle speed, and the torque control section 1400 can operates as a generator when the vehicle load is larger than the engine torque, as described with regard to the first embodiment.

Fourth Embodiment

A T-S converter according to a fourth embodiment is described with reference to FIG. 7.

Figure 5:
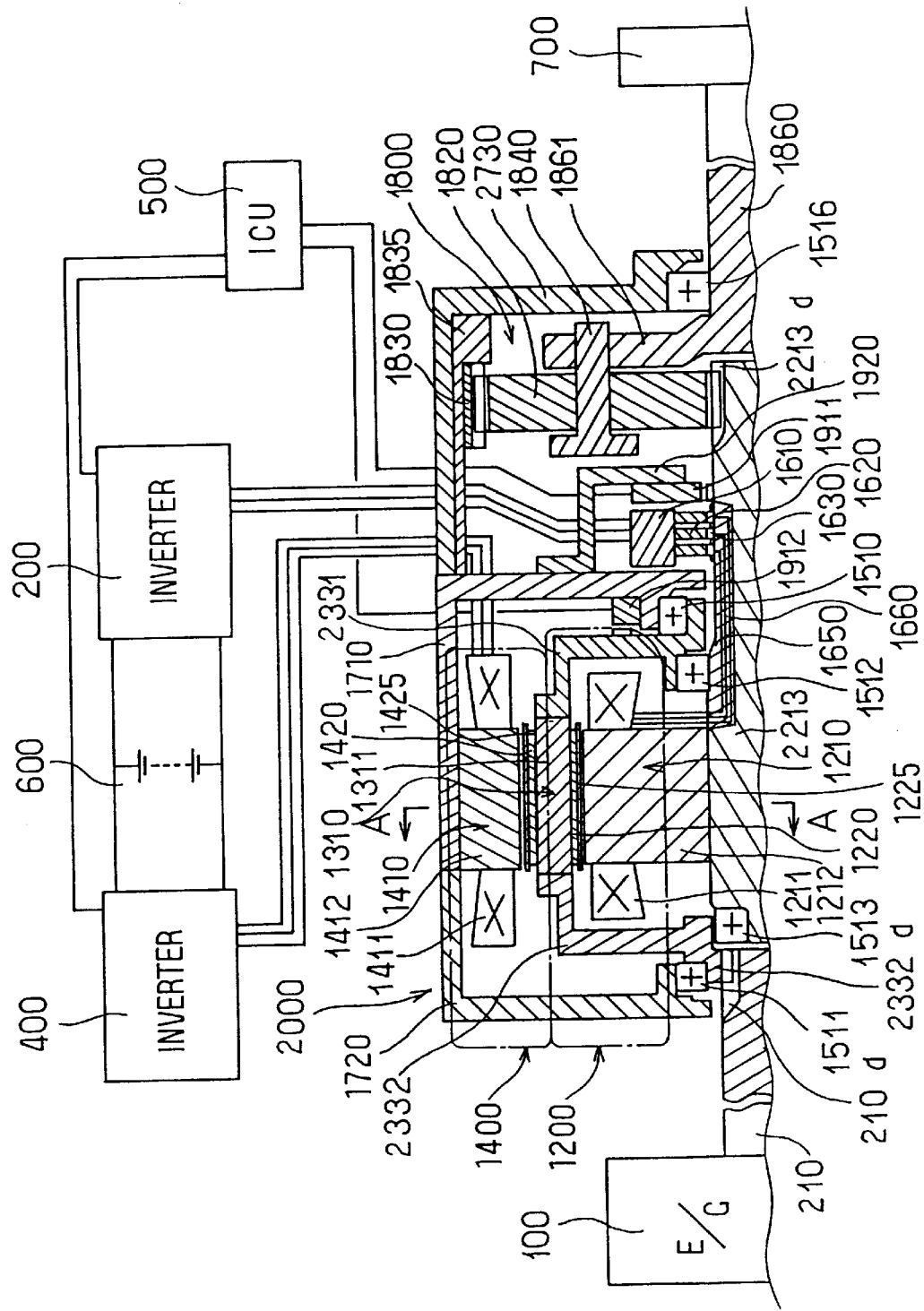
FIG. 5 is a schematic cross-sectional side view illustrating a system according to a third embodiment of the present invention.

The second rotor 1310 according to the fourth embodiment has squirrel-cage-conductors 1227 and 1427 instead of the permanent magnets of the T-S converter 2000 according to the third embodiment shown in FIG. 5. Accordingly, the second rotor 1310 operates as an induction motor instead of a synchronous motor in the first embodiment as described with regard to the second embodiment.

A cylindrical non-magnetic layer 1350 is disposed between the squirrel-cage-conductors in order to prevent magnetic interference between the speed control section 1200 and the torque control section 1400, as shown in FIG. 4 for the second embodiment.

Fifth Embodiment

Figure 11:
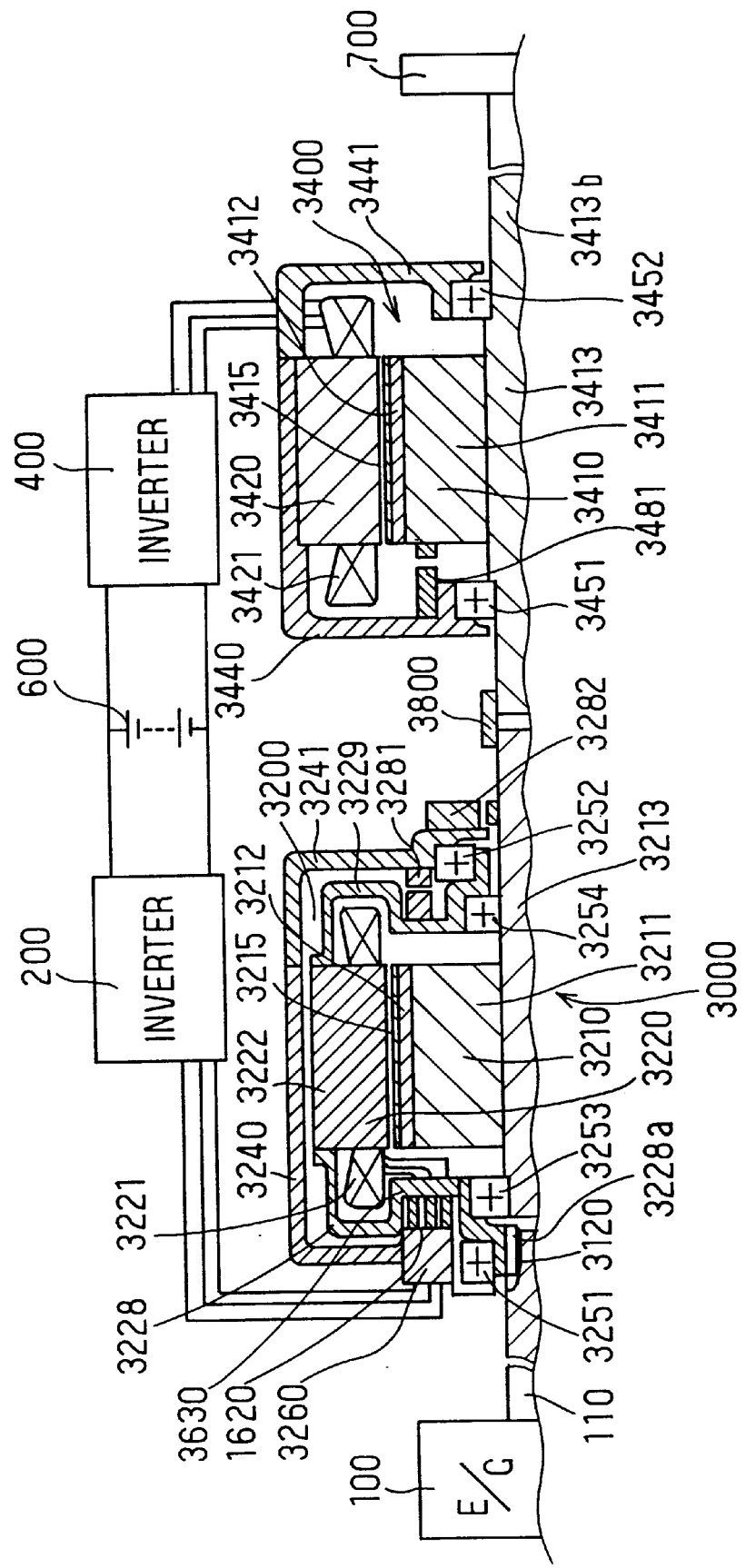
FIG. 11 is a schematic cross-sectional side view illustrating a system according to a fifth embodiment of the present invention.

A T-S converter 3000 according to a fifth embodiment of the present invention is described with reference to FIG. 11. The T-S converter 3000 is composed of a speed control section 3200 and a torque control section 3400 disposed tandem on an axis.

The speed control section 3200 is structured as a three-phase synchronous rotary electric machine and is composed of housings 3240 and 3241, a cylindrical second rotor 3220 supported by the housings 3240 and 3241 through bearings 3251 and 3252 and a first rotor.

The second rotor 3220 is connected to the output shaft 110 of the engine 100 and carries a shaft 3213 of a first rotor 3210 in line with the output shaft 110 of the engine 100 via bearings 3253 and 3254. The second rotor has a stator core 3222, a three-phase-winding coil (known as a coil of the three-phase rotary machine) 3221 and a pair of end frames 3228 and 3229.

The first rotor 3210 has a shaft 3213, a rotor core 3211 made of a soft iron which is fixed to the shaft 3213, magnetic poles having permanent magnets secured to the outer periphery of the core by a non-magnetic ring 3215 in structure well-known as a permanent magnet rotor of a generator.

An annular slip ring member 3630 is fixed to a radially inner portion of the end frame 3228. The slip ring member 3630 has three slip rings, which are connected to each phase winding of the coil 3221 and supported by an insulating member.

A brush member 3260 is connected to the inverter 200 and fitted to an opening which is formed on an end portion of the housing 3240. The brush member 3260 has a brush holder, three brushes 1620 slidably disposed in the brush holder and springs which bias the brushes against the slip rings. The inverter 200 supplies the coil 3221 with control current through the brush member 3260 and the slip ring member 3630.

A rotational speed sensor 3281 is disposed between an inner surface of the housing 3241 and an outer surface of the end frame 3229 to detect rotational speed of the second rotor 3220 and to send a signal to the inverter control unit 500 (which is described before). A rotational speed sensor 3282 is disposed between the outer surface of the housing 3241 and the shaft 3213 of the first rotor 3210 to detect rotational speed of the first rotor 3210 and send a signal to the inverter control unit 500.

The speed control section 3200 can be structured as an induction type rotary machine which provides squirrel cage conductors instead of the permanent-magnet poles.

The torque control section 3400 is a three-phase synchronous rotary machine. The torque control section 3400 has a third rotor 3410, housings 3440 and 3441 which support the third rotor 3410 via bearings 3451 and 3452, a stator core 3420 secured to the housing 3440 and a stator coil 3421 which is connected to the inverter 400. The third rotor 3410 has a shaft 3413 connected in line to the shaft 3213 of the first rotor 3210 by a coupling member 3800, a rotor core 3411 made of soft iron and a plurality of magnetic poles 3412 having permanent magnets supported by a non-magnetic ring 3415 in structure well-known as a permanent magnet rotor.

A rotational speed sensor 3481 is disposed between an inner surface of the housing 3440 and an end surface of the third rotor 3410 to detect rotational speed of the third rotor 3410. When the engine 100 rotates, the second rotor 3220 is driven by the engine 100 and drives the first rotor 3210 and the third rotor which is connected thereto by electromagnetic force generated by the coil 3221 to rotate at a set rotational speed. The coil 3221 is controlled by the inverter 200 in a manner readily understood from the previous description. The inverter 400 supplies the stator coil 3421 with a control current so that the third rotor 3410 drives the vehicle wheels 700 with a set torque at the set speed in the same manner described before.

Sixth Embodiment

Figure 12:
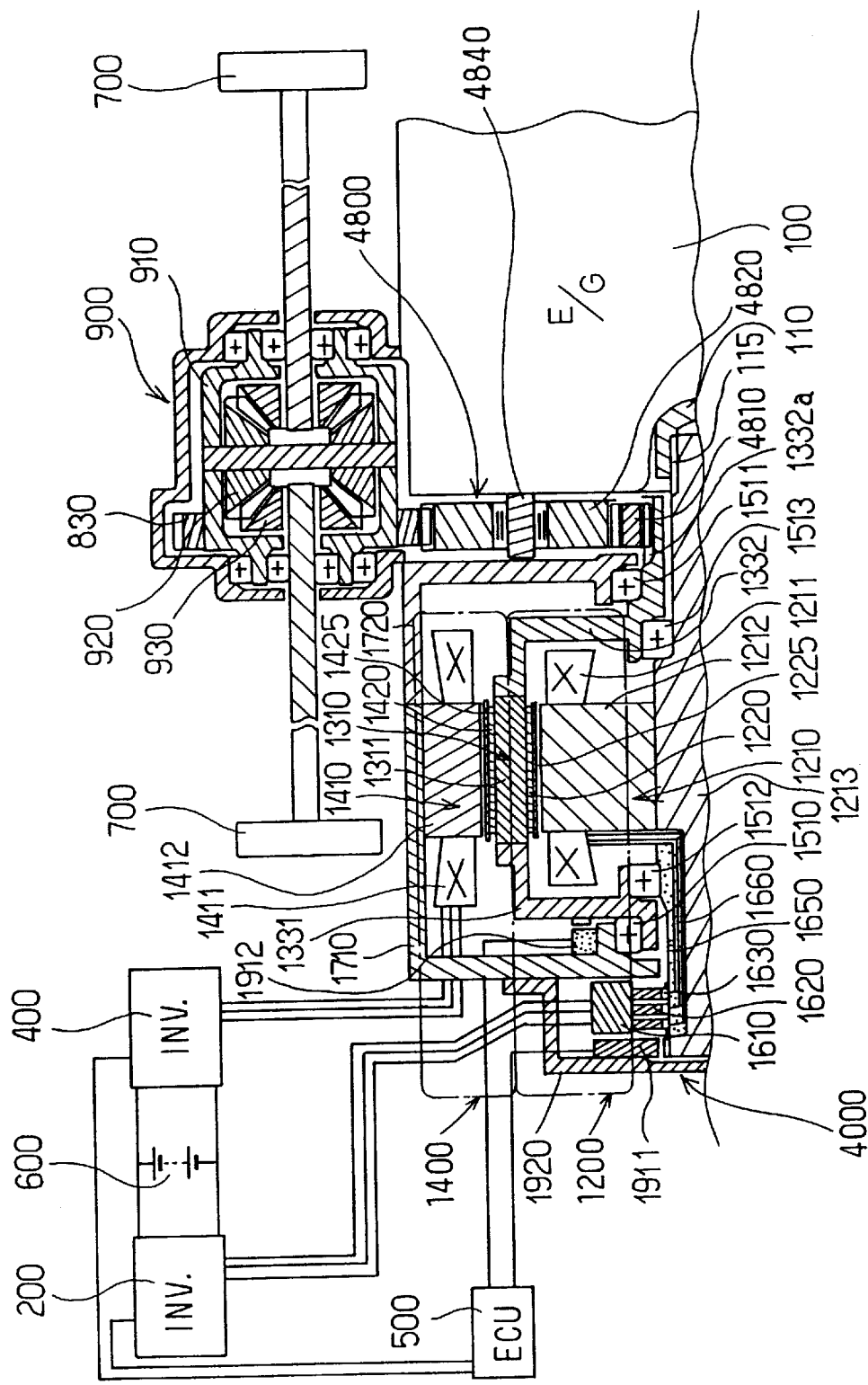
FIG. 12 is a schematic cross-sectional side view illustrating a system according to a sixth embodiment of the present invention.

A T-S converter 4000 according to a sixth embodiment of the present invention is described with reference to FIG. 12.

The input shaft 1213 is connected to the engine output shaft 110 at the same side the speed reduction section 4800 is connected to the vehicle wheels 700 via a differential gear 900 in this embodiment. As a result, the T-S converter 4000 can be mounted in a limited space around the engine.

The speed reduction section 4800 is composed of a small gear 4810 and a large gear 4820 which is carried by a gear shaft 4840 and in mesh with the small gear 4810. The differential gear 900 is a common type which is composed of a large gear 830, a gear box 910 and differential gears 920 and 930 connected to the vehicle wheels 700.

The small gear 4810 of the speed reduction section 4800 is in mesh with the internal gear 1332*a* of the boss portion of the rotor frame 1332 which rotates as an output shaft of the T-S converter around the input shaft 1213, and the large gear 4820 of the speed reduction section 4800 is in mesh with the large gear 830 of the differential gear 900.

The rotation sensors 1911 and 1912 are disposed at a side remote from the output shaft of the engine and the output member (1332*a*) of the second rotor so that noise caused by torque transmission between the engine and the converter and between the converter and the vehicle wheels can be prevented from transmitting to the rotation sensors 1911 and 1912.

The brushes 1620 and slip rings 1630 are also disposed remote from the output shaft so that chattering of the brushes caused by the torque transmission can be prevented.

The speed reduction section 4800 can be composed of bevel gears instead of the spur gear.

Seventh Embodiment

Figure 13:
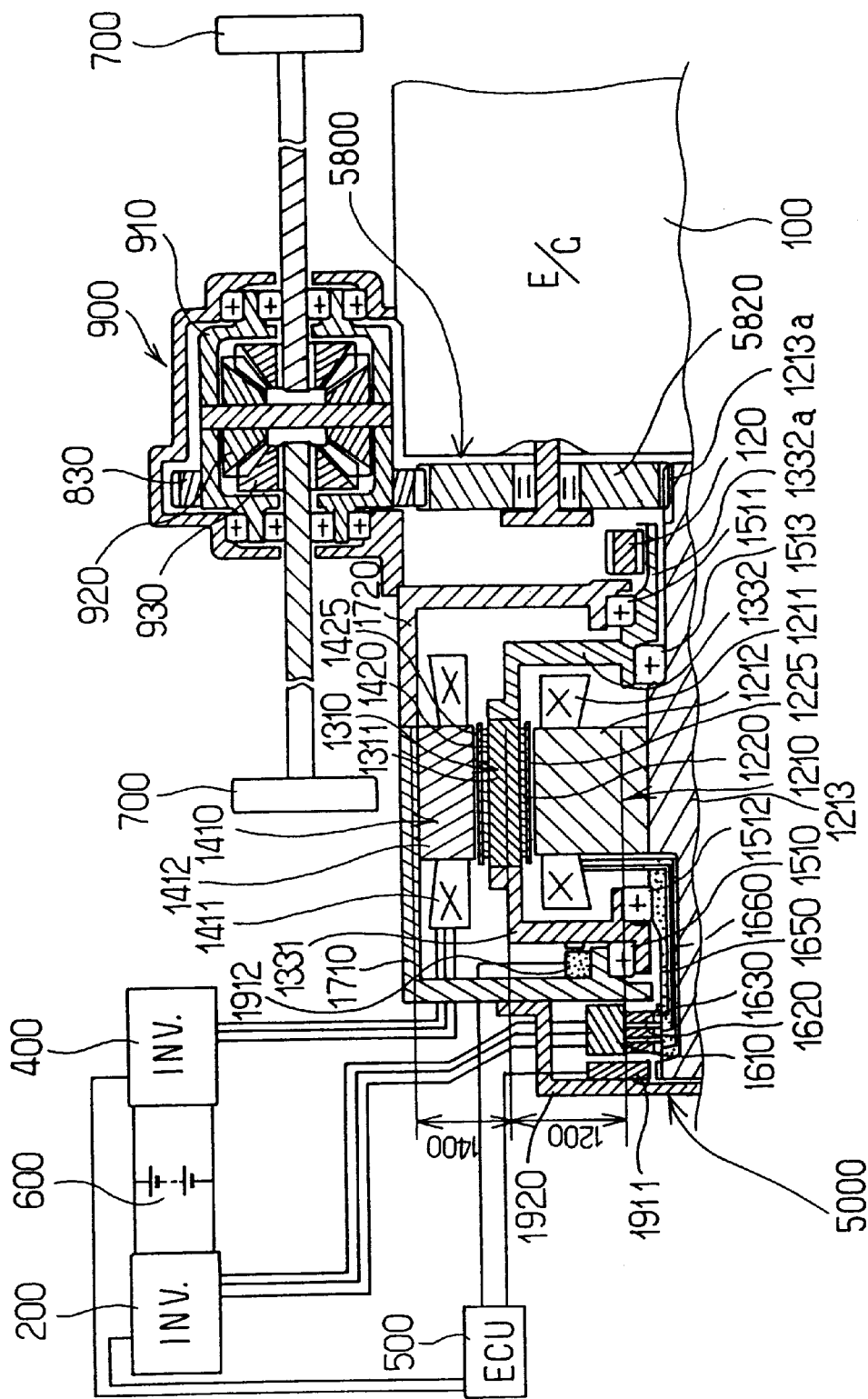
FIG. 13 is a schematic cross-sectional side view illustrating a system according to a seventh embodiment of the present invention.

A T-S converter 5000 according to a seventh embodiment of the present invention is described with reference to FIG. 13 and FIG. 14.

Figure 14:
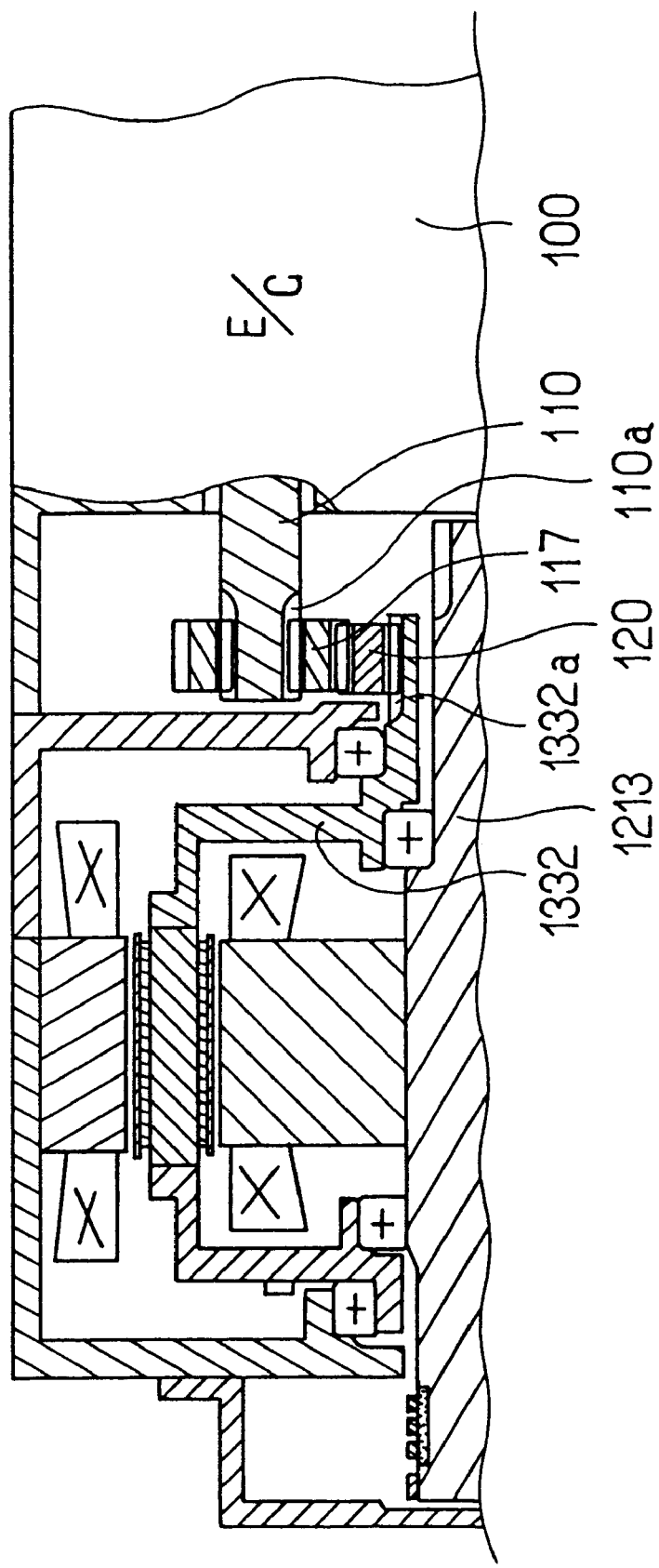
FIG. 14 is a schematic cross-sectional side view illustrating a portion of the system shown in FIG. 13.

A gear 117 is carried by the output shaft 110 of the engine 100 through serrations 110*a*, and is in mesh with a gear 120 which is connected to the frame 1332 of the second rotor 1310 through serrations 1332*a* so that the engine power is transmitted to the second rotor 1310 directly as shown in FIG. 14. The first rotor 1210 is carried by the shaft 1213 which is separated from the engine output shaft. A speed reduction section 5800 is composed of a large gear 5820 which is secured to a portion of the engine 100 and is in mesh with the large gear 830 of the differential gear 900 described before. A gear 1213*a* is formed at the end of the shaft 1213 on the side of the engine 100 and is in mesh with the large gear 5820.

Driving power is transmitted from the first rotor 1210 through the gear 1213*a*, the large gear 5820 and the deferential gear 900 to the vehicle wheels 700.

Variations of the Second Rotors

Structural variations of the second rotor 1310 are described briefly with reference to FIGS. 13A through 13H.

Figure 15A:
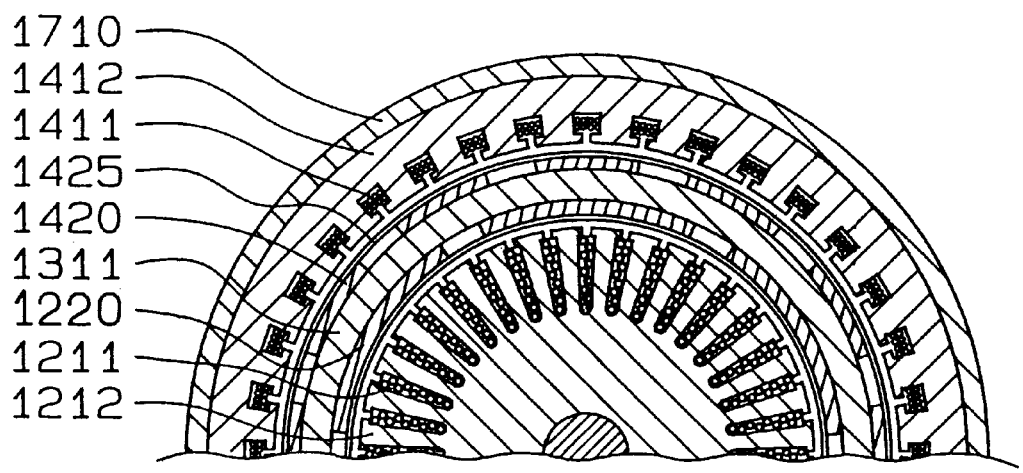
FIGS. 15A, 15B, 15C, 15D, 15E and 15F are cross-sectional views illustrating variations of a second rotor of the V-S converter according to the present invention.

The number of the internal magnets 1220 of the second rotor 1310 is different from the number of the external magnets 1420, and the internal magnet is wider than the external magnet 1420 as shown in FIG. 15A.

Figure 15B:
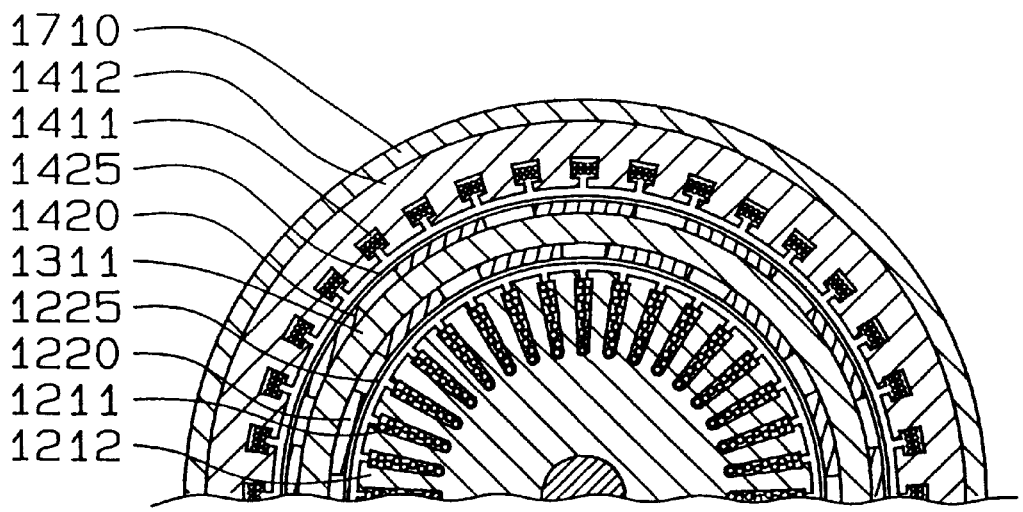

The angular position of the internal magnets 1220 is different from that of the external magnets 1420 as shown in FIG. 15B.

Figure 15C:
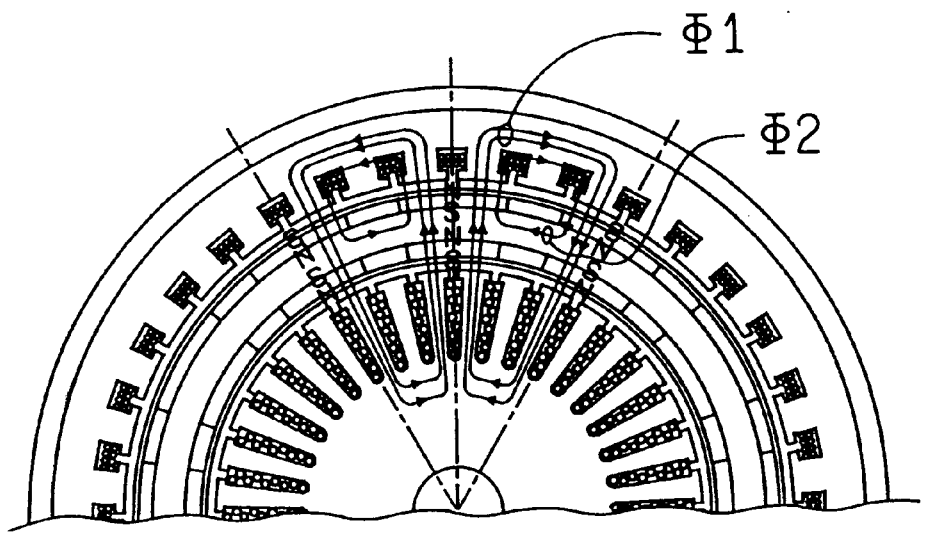

The number and the angular position of both internal and external magnets are the same as shown in FIG. 3 and FIG. 15C, however, the magnetic polarity on the same angular position is specific. That is, if one of the internal magnets 1220 facing the first rotor 1210 is polarized S, a corresponding one of the external magnets 1420 facing the stator 1410 is polarized N and the adjacent one of the internal magnets 1220 is polarized N and also the adjacent one of the external magnets 1420 corresponding to the last is polarized S so that the composite magnetic flux $\Phi 1$ generated by both internal and external magnets interlinks both coils 1211 and 1411 as shown in FIG. 15C. As a result, differential magnetic flux $\Phi 2$ passing between both coils 1211 and 1411 is reduced and radial thickness of the rotary yoke 1311 can be reduced.

Figure 15D:
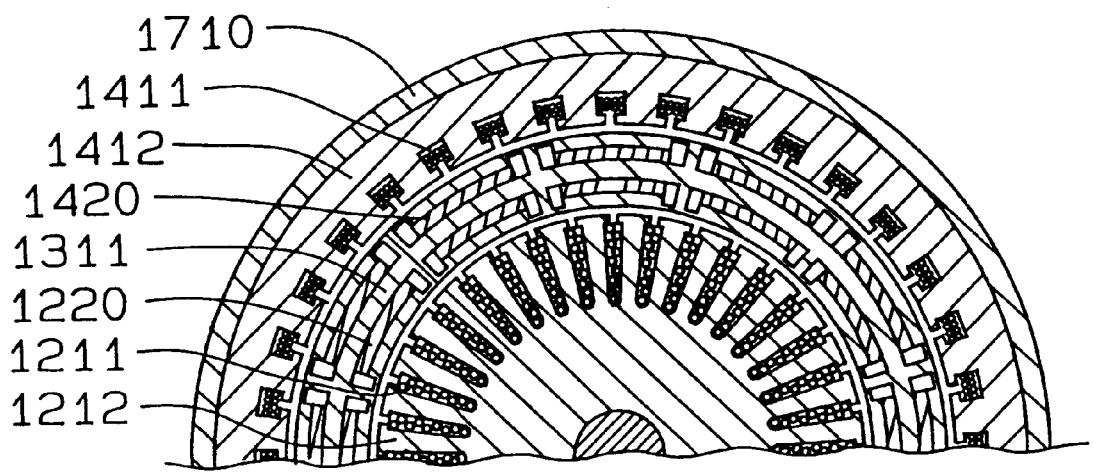

The above effect can be attained also by a structure shown in FIG. 15D. The internal and external magnets 1220 and 1420 are disposed in cavities hollowed out of the rotary yoke 1311 which is made of laminated thin steel-plates so that the non-magnetic ring 1425 can be omitted. Since the outer periphery of the rotary yoke can be lathed, the gaps between the first and second rotors 1210 and 1310 and between the second rotor 1310 and the stator core 1412 can be reduced, thereby reducing the size of the T-S converter.

Figure 15E:
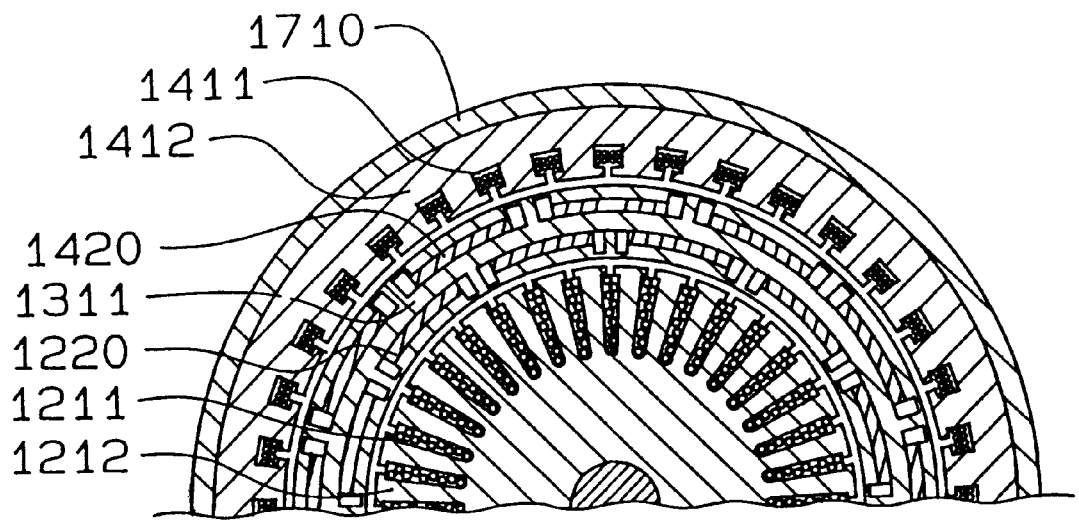

The angular position of the external magnets 1420 is shifted from the angular position of the internal magnets 1220 in the second rotor 1310 as shown in FIG. 15E.

Figure 15F:
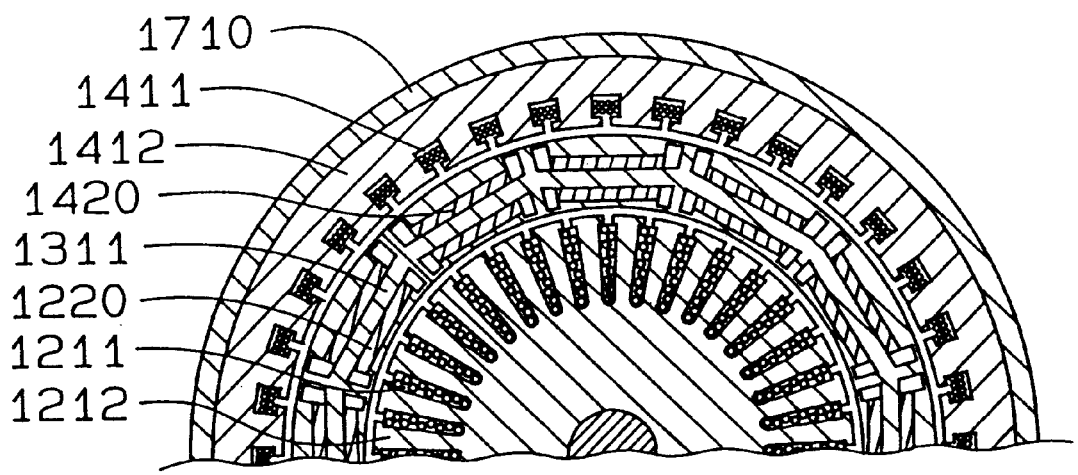

Flat magnets are used for the internal and external magnets 1220 and 1420 in the second rotor 1310 as shown in FIG. 15F.

Eighth Embodiment

A T-S converter 6000 according to an eighth embodiment of the present invention is described with reference to FIGS. 16 to 21.

A gear 840 is fixed to the left side of the rotor frame 1332 of the second rotor 1310 by a bolt 841. The gear 840 transmits the output power of the engine and the T-S converter 6000 to the vehicle wheels 700 through a speed reduction section 800, a connecting gear 845 and a differential gear section 900.

Figure 18:
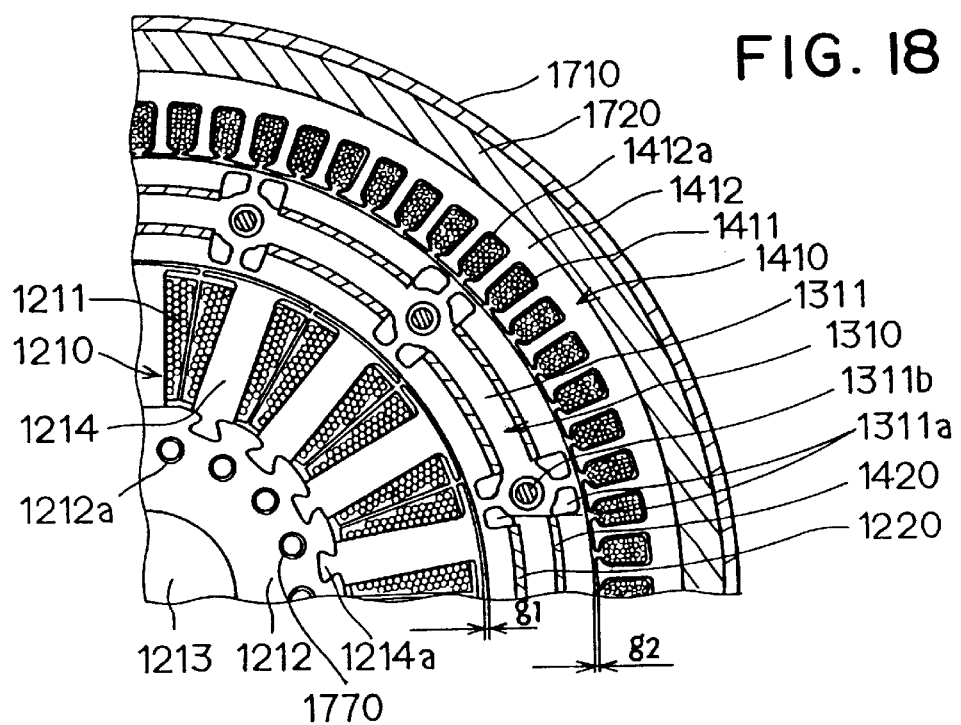
FIG. 18 is a cross-sectional schematic view illustrating a main portion of a T-S converter of the system shown in FIG. 16.

As shown in FIG. 18, the first rotor 1210 is composed of the rotor core 1212 and a plurality of T-shaped rotor teeth 1214 fitted to the outer periphery of the rotor core 1212 at equal intervals. Each of the rotor teeth has a dove-tail portion fitted in one of grooves formed on the outer periphery of the rotor core 1212. The rotary yoke 1311 of the second rotor 1310 is disposed around the first rotor 1210 at a gap g1. A pair of cavities 1311a are formed in the rotary yoke 1311 at opposite sides of each of the permanent magnets 1220 and 1420 to suppress the leakage of the magnetic flux. The outer periphery of the rotary yoke 1311 faces the inner periphery of the stator 1410 at a gap g2.

Figure 19:
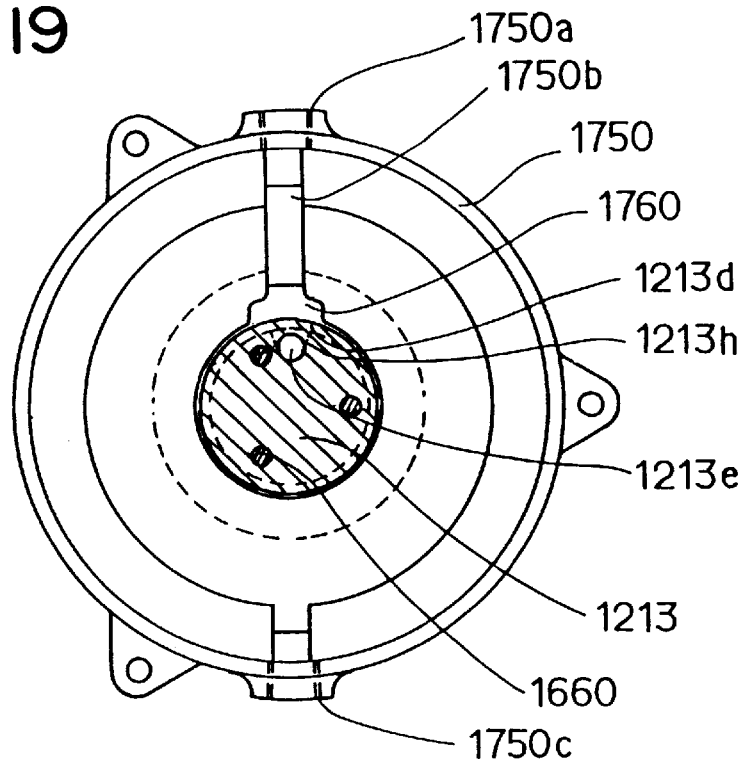
FIG. 19 is a cross sectional view illustrating a coolant housing of the system shown in FIG. 16 cut along a line indicated by arrows 19—19 viewed from A.
Figure 20:
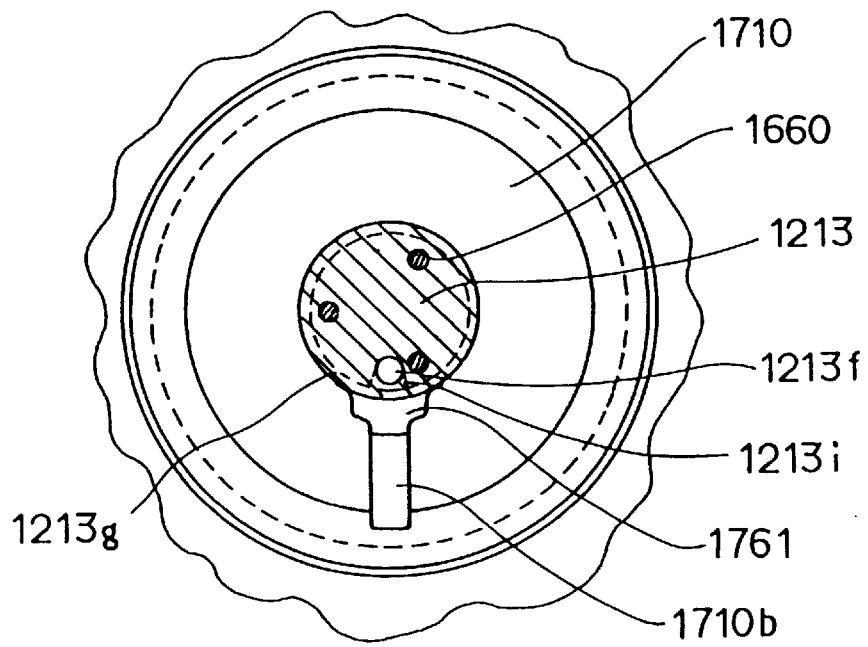
FIG. 20 is a cross sectional view illustrating the coolant housing of the system shown in FIG. 16 cut along a line indicated by arrows 20—20 viewed from B.

An coolant housing 1750 is disposed between the rotation sensors 1911, 1912 and a power supply section 1600 which includes the brush holder 1610, three brushes 1620, three slip rings 1630 and a cover case 1920 and supplies three phase electric power to the control coil 1211 of the first rotor 1210. A coolant passage 1752 is connected to an inlet 1750a of the coolant housing 1750 so that the coolant is taken in therefrom and flows to annular grooves 1213d formed around the shaft 1213 through spaces between a groove 1750b formed in the coolant housing 1750 and the outer frame 1710. An oil seal 1760 is inserted between the outer frame 1710 and the shaft 1213, and an oil seal 1761 is inserted between the coolant housing 1750 and the shaft 1213. The coolant passes the grooves 1213d and intake conduits 1213e formed longitudinally on the shaft 1213 and reaches the inlet side 1770a of coolant pipes 1770 which are inserted in holes 1212a formed in the rotor core 1212 as shown in FIG. 18 through a joint housing 1775. The coolant in the inlet side 1770a cools the first rotor 1210 and flows through the coolant pipe's outlet side 1770b, the joint housing's outlet side 1775b, a return conduit 1213f formed longitudinally on the shaft 1213, and a return annular groove 1213g to the outside of the outer frame 1710. The coolant passes through spaces between grooves 1710b formed in the outer frame 1710 and the coolant housing 1750 to an outlet 17501c which is connected to a radiator (not shown) through a coolant outlet passage 1753. The coolant is cooled by the radiator and taken into the coolant passage 1752 again. As shown in FIG. 19 viewed from the left side B of the coolant housing 1750 in FIG. 16 and FIG. 20 viewed from the left side B of the coolant housing 1750 in FIG. 16, the inlet 1750a is formed at the top of the coolant housing 1750. A groove 1213h is formed in the shaft 1213 to connect the annular groove 1213d and the intake conduit 1213e. A groove 1213i is formed in the shaft 1213 to connect the return annular groove 1213g and the return conduit 1213f. The coolant housing 1750 protect the inside of the T-S converter from carbon powder produced from the brushes and cools the power supply section 1600.

Figure 21:
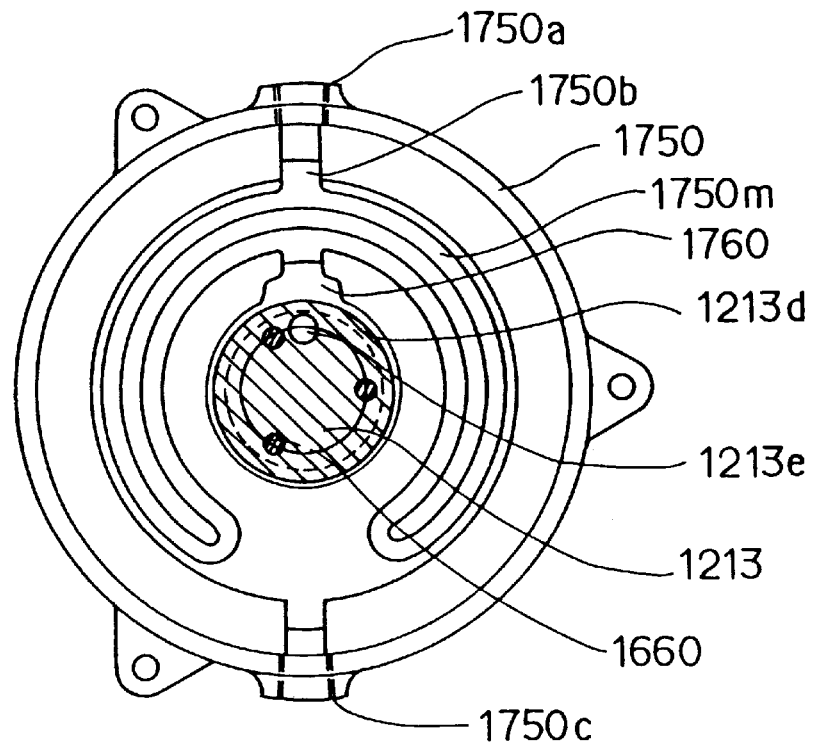
FIG. 21 is a variation of the coolant housing shown in FIGS. 19 and 20.

A variation of the coolant housing is shown in FIG. 21. A double C-shaped groove 1750m is formed on the surface of the coolant housing 1750 to enhance the heat radiation.

Ninth Embodiment

Figure 24:
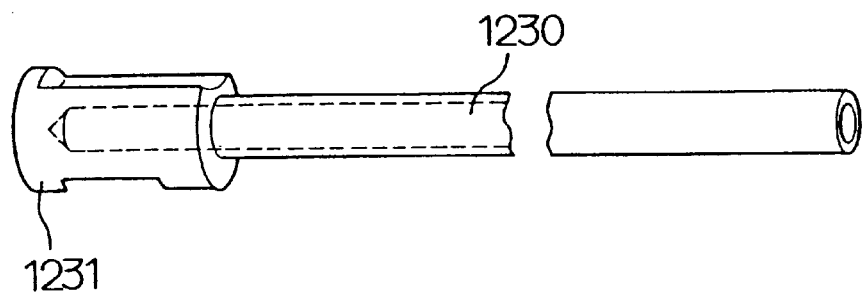
FIG. 24 is a perspective view illustrating a pipe and a joint shown in FIGS. 22 and 23.
Figure 22:
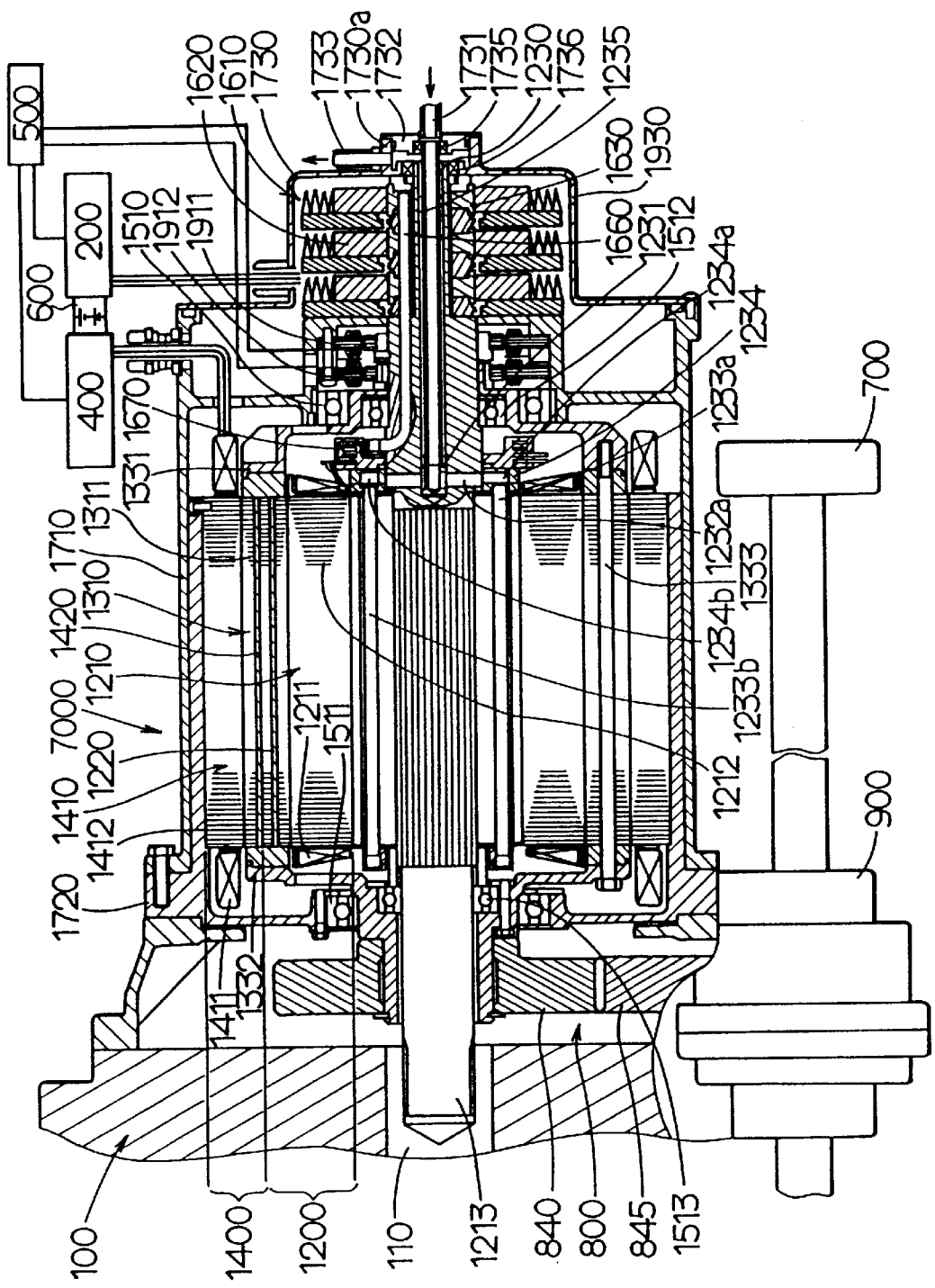
FIG. 22 is a schematic cross-sectional side view illustrating a system according to a ninth embodiment of the present invention.
Figure 23:
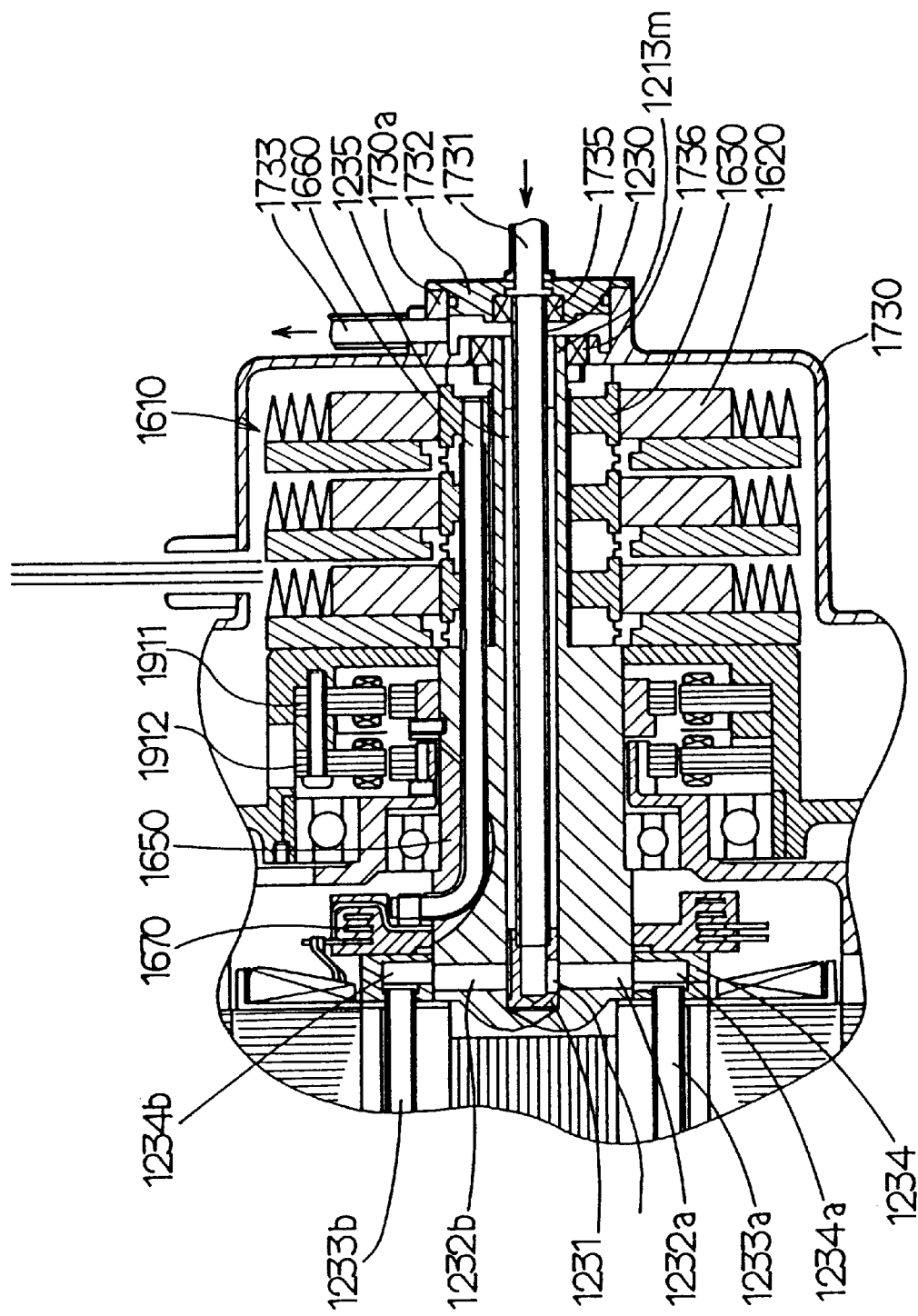
FIG. 23 is a schematic cross-sectional side view illustrating a portion of the system shown in FIG. 22.

A T-S converter 7000 according to a ninth embodiment of the present invention is described with reference to FIGS. 22 to 24.

A cooling circuit of the T-S converter 7000 is composed of a coolant intake pipe 1731, a support plate 1732 which supports the coolant intake pipe 1731, an coolant pipe 1230 which is connected to the coolant intake pipe 1731, a joint 1231 which has an opening 1231a, a coolant pipe 1233 which has an intake side 1233a and a return side 1233b formed in the rotor core 1212, a joint housing 1234 which has an intake side 1234a and a return side 1234b, a longitudinal hole 1235 formed in the shaft 1213 and a coolant outlet pipe 1733. The space between the intake pipe 1731 and the support plate 1732 is sealed by an oil seal 1735.

The coolant is taken from the coolant intake pipe 1731 into a conduit 1232a formed radially in the shaft 1213 through the pipe 1230 and the opening 1231a of the joint 1231. The coolant flows through the joint housing's intake side 1234a into the coolant pipe's intake side 1233a. The coolant cools the first rotor 1210 and flows to the frame 1730 through the coolant pipe's return side 1233b, the joint housing's return side 1234b and a space between the longitudinal hole 1235 and the outer periphery of the pipe 1230. The frame 1730 has an outlet 1730a, and the coolant flows therefrom to a radiator (not shown) through the coolant outlet pipe 1733. The coolant is cooled by the radiator and taken into the intake pipe 1731 again.

A heat conductive ceramic layer 1213m is coated on the shaft 1213, and the slip rings 1630 are fitted thereto. Accordingly, the heat of the slip rings 1630 is dissipated through the ceramic layer 1213m to the coolant flowing inside the shaft 1213.

Figure 16:
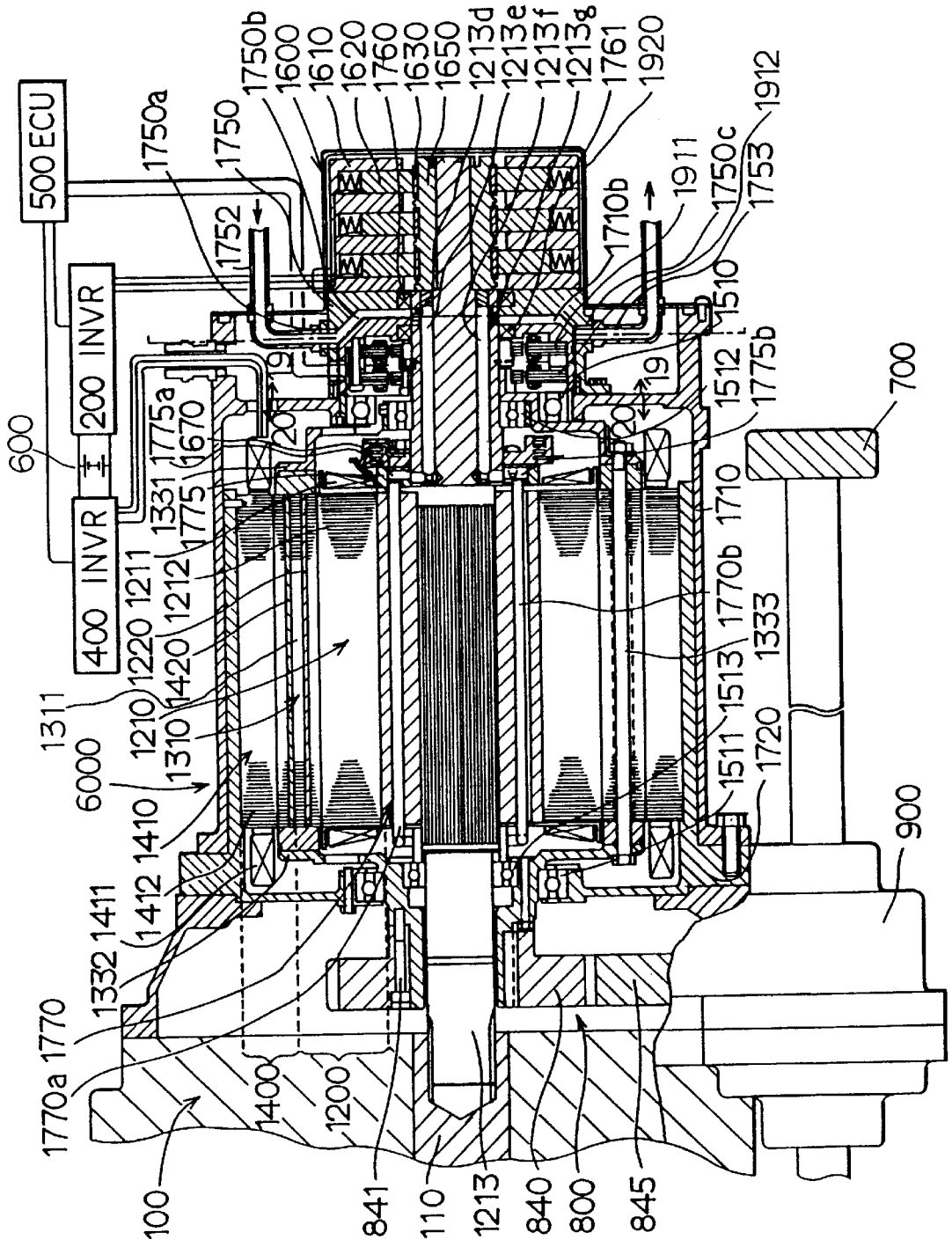
FIG. 16 is a schematic cross-sectional side view illustrating a system according to an eighth embodiment of the present invention.
Figure 17:
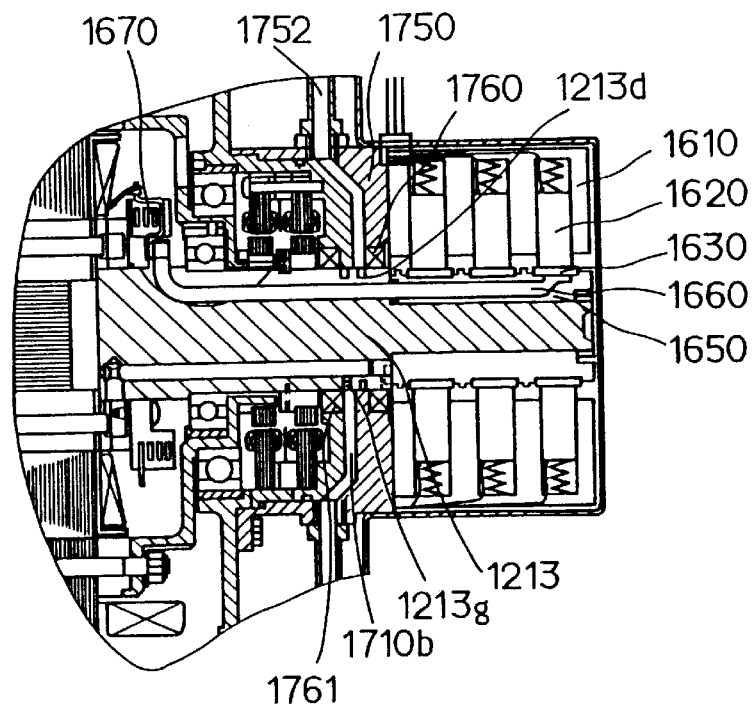
FIG. 17 is a schematic cross-sectional side view illustrating a portion of the system shown in FIG. 16.
Figure 25:
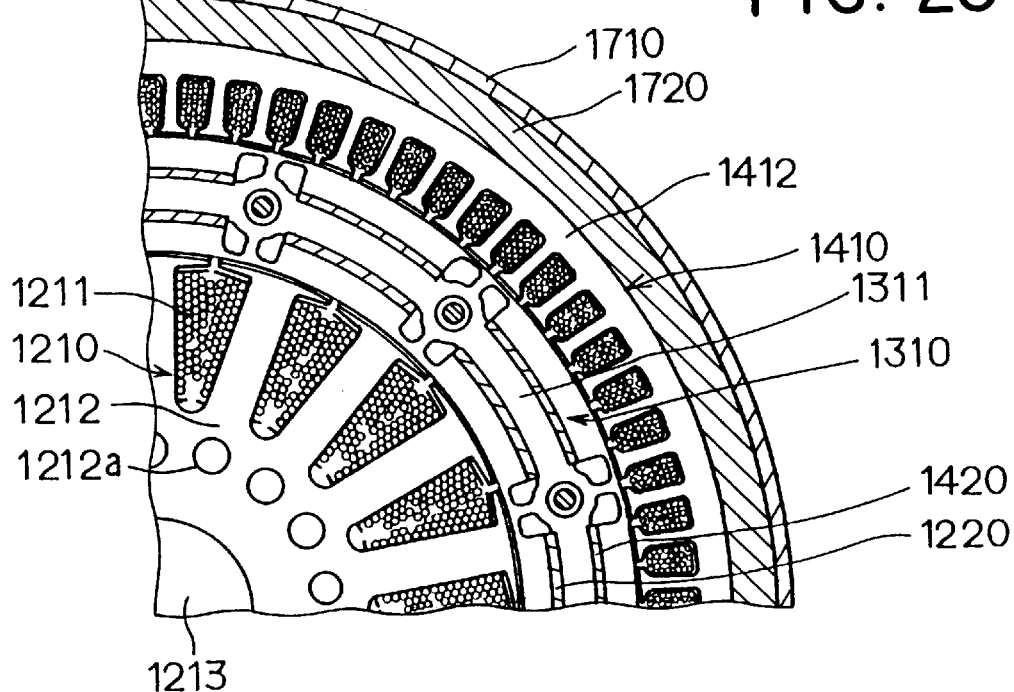
FIG. 25 is a variation of the T-S converter of the system shown in FIG. 22.

A variation of the first rotor 1210 is shown in FIG. 25. The teeth and the center core of the first rotor 1210 are not separated, and the pipe 1770 shown in FIG. 16 is omitted in this embodiment. The center core is formed water-tightly so that coolant flows through the holes 1212a directly in this embodiment.

Figure 26:
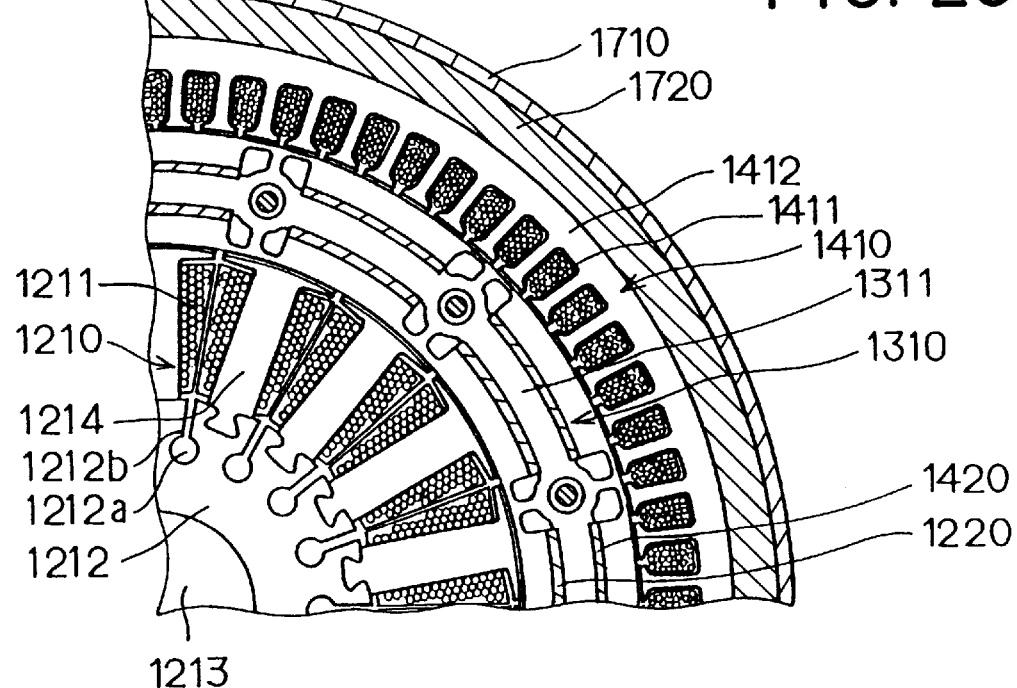
FIG. 26 is another variation of the T-S converter of the system shown in FIG. 22.

Another variation of the first rotor 1210 is shown in FIG. 26.

A slit 1212b is formed at every portion of the rotor core between teeth 1214 of the rotor core 1212 so that the coolant flows out of the slits 1212b to cool the teeth 1214 and the control coil 1211 directly. The coolant is collected by means of gravity and returns through a passage formed in the first rotor 1210.

Figure 27:
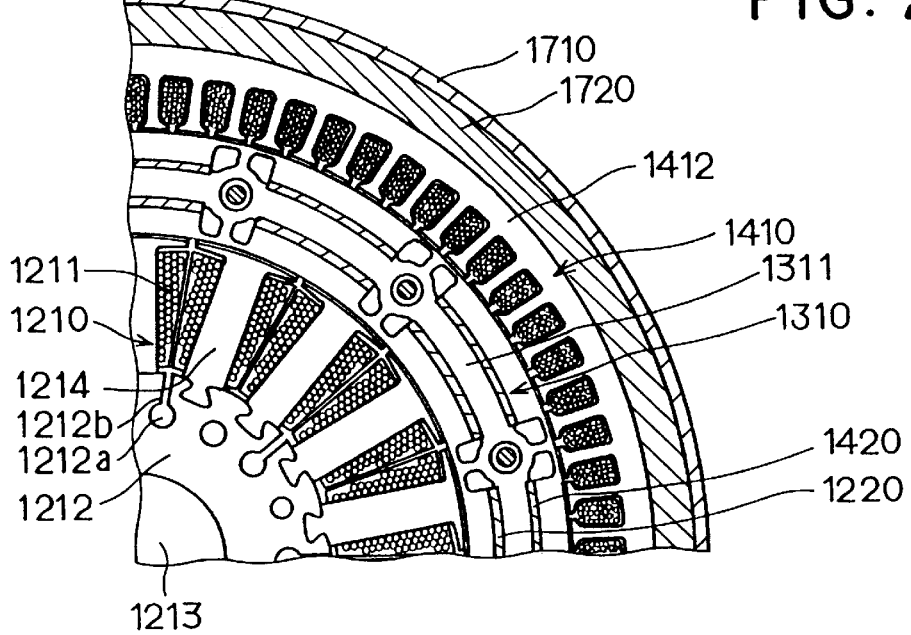
FIG. 27 is a cross-sectional schematic view illustrating a variation of the T-S converter according to the ninth embodiment.
Figure 28:
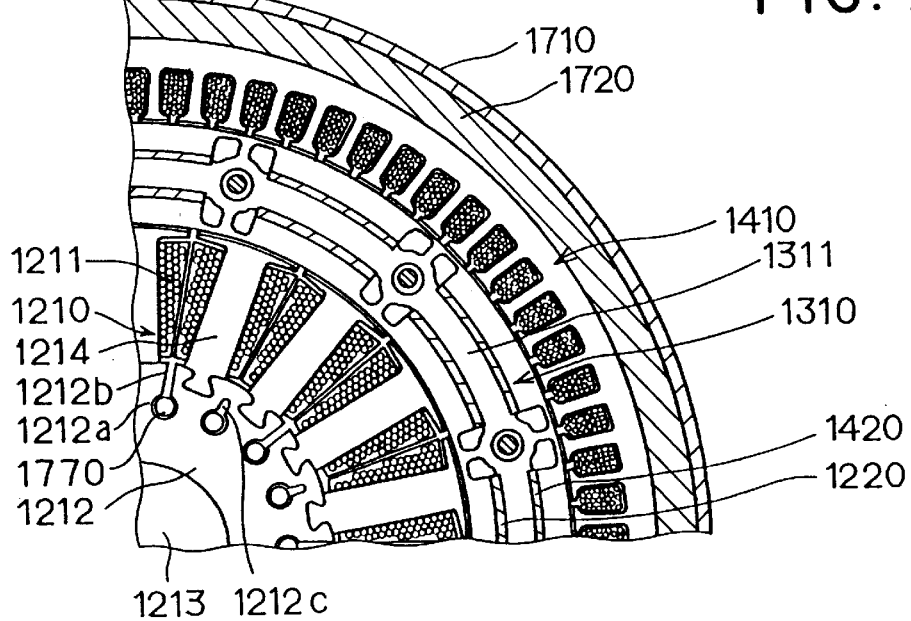
FIG. 28 is a cross-sectional schematic view illustrating a variation of the T-S converter according to the ninth embodiment.
Figure 29:
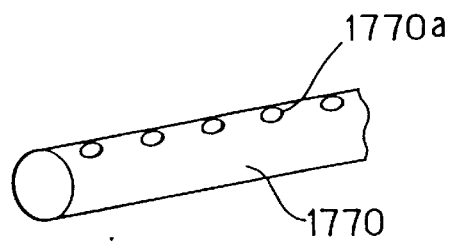
FIG. 29 is a schematic perspective view illustrating a portion of a pipe shown in FIG. 28.

Other variations of the first rotor 1210 are shown in FIGS. 27 to 29. As shown in FIGS. 27 and 28, the slit 1212b is formed at every two portions of the rotor core 1212 between the adjacent teeth 1214. In FIG. 28, the pipes 1770 are inserted into the holes 1212a which has a groove 1212c. Each of the pipe 1770 has a plurality of openings 1770a of a size suitable for the discharging amount of the coolant, from which the coolant is discharged through the groove 1212c.

Tenth Embodiment

Figure 30:
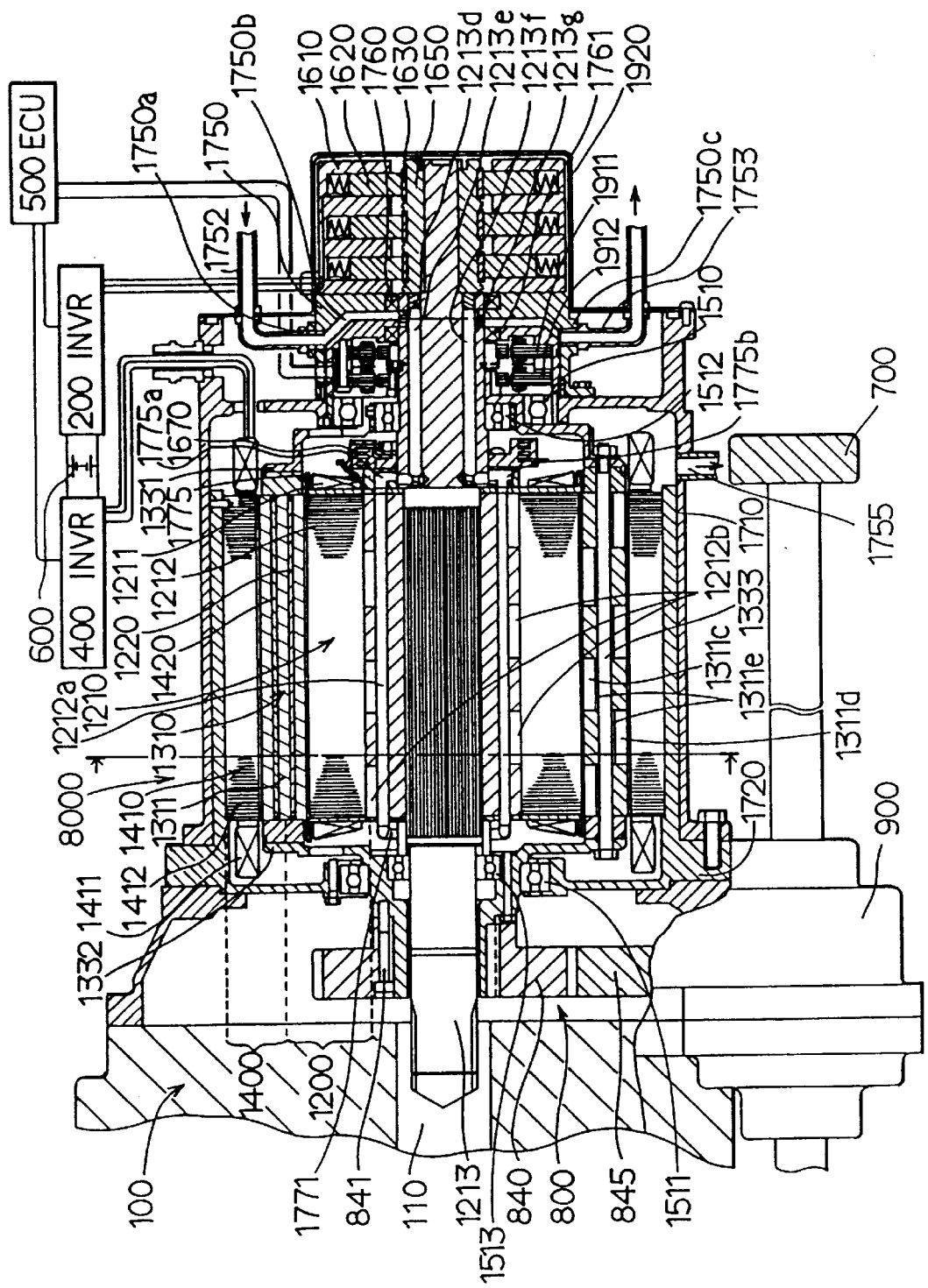
FIG. 30 is a schematic cross-sectional side view illustrating a system according to a tenth embodiment of the present invention.
Figure 31:
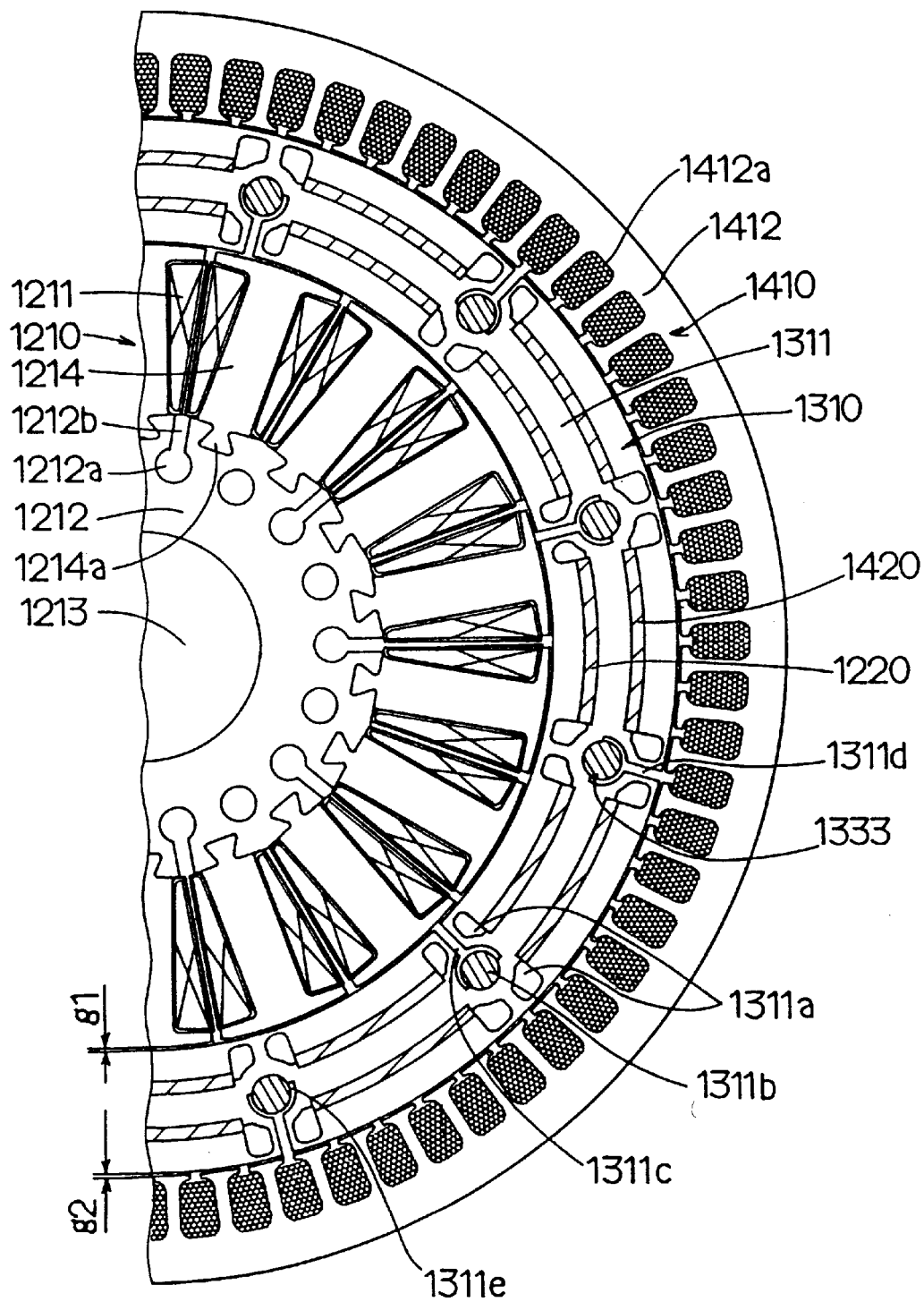
FIG. 31 is a cross-sectional view illustrating a main portion of a T-S converter of the system shown in FIG. 30.

A T-S converter 8000 according to a tenth embodiment of the present invention is described with reference to FIGS. 30 and 31.

Internal slits 1311c having C-shaped grooves 1311e and external slits 1311d having C-shaped grooves 1311e are formed in the rotary yoke to provide coolant passages from the first air gap g1 to the second air gap g2. The C-shaped grooves surround bolts or rivets 1333 and their holes 1311b. The rotary yoke is composed of laminated steel sheets each of which has the internal slits 1311c, grooves 1311e and external slits 1311d. One sheet is put on another sheet so that the internal slits 1311c of one sheet come to the C-shaped grooves of the external slits 1311d of another sheet thereby overlapping the C-shaped grooves of two sheets and making a thin through coolant passage in two sheets.

A part of the coolant flows out of the slits 1212b toward the control coil 1211 and the remainder returns to the outside of the outer frame 1710 as described in the previous embodiments.

The coolant flowing toward the control coil 1211 cools the coil 1211 and reaches the first air gap g1. The coolant flows from the first air gap g1 into the slits 1311c of the rotary yoke 1311 and flows through the C-shaped grooves 1311e of adjacent sheets to the slit 1311d into the slit 1311d, from which the coolant flows out to the second air gap g2. The coolant, then, cools the stator core 1412 and the stator coil 1411 and is collected at a lowest portion and returned to the radiator through a coolant outlet passage 1755.

All the coolant can be introduced to cool the control coil 1211 and the stator coil 1411 directly and returned to the radiator though the outlet passage 1755.

Eleventh Embodiment

Figure 32:
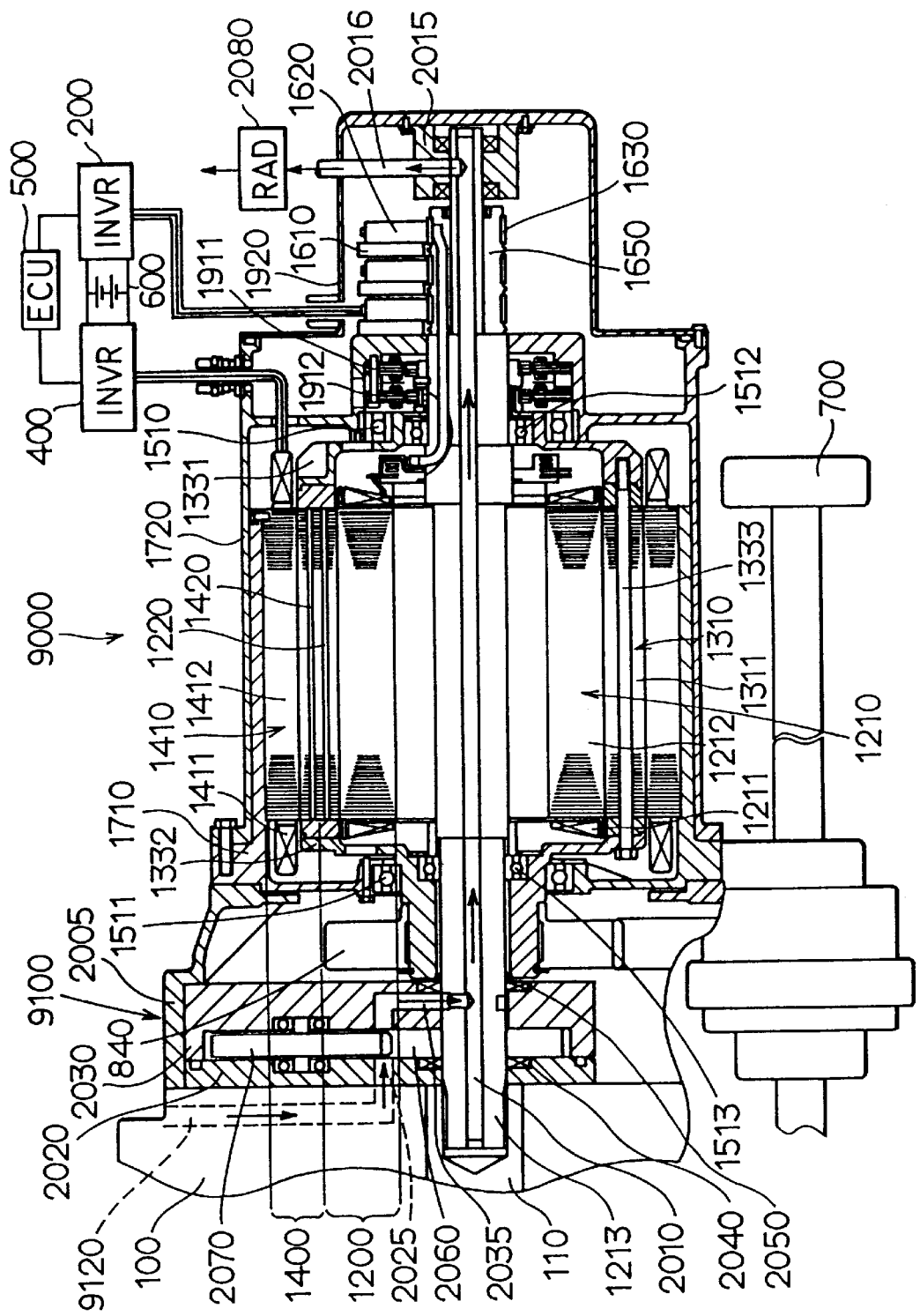
FIG. 32 is a schematic cross-sectional side view illustrating a system according to an eleventh embodiment of the present invention.
Figure 33:
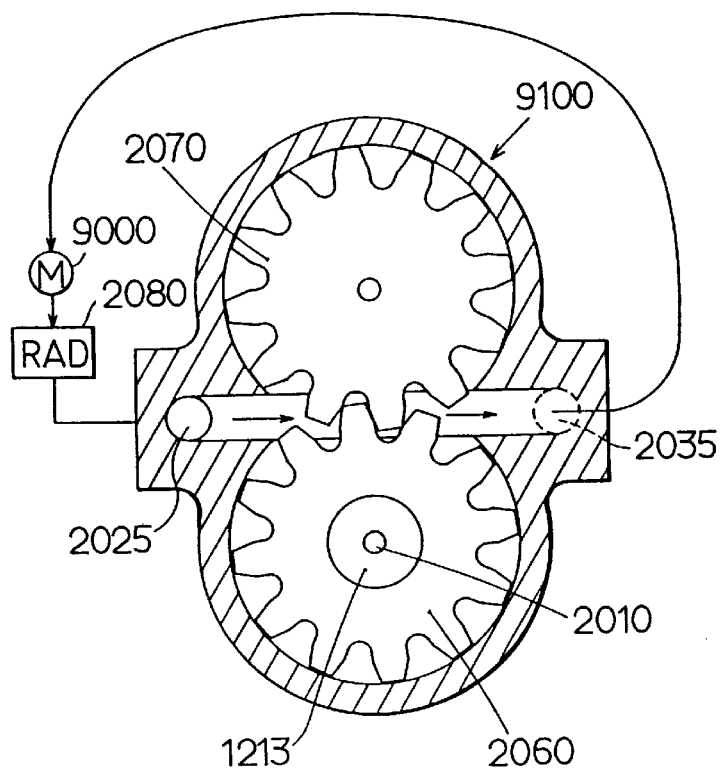
FIG. 33 is a schematic view illustrating a pump of the system shown in FIG. 32.

A T-S converter 9000 according to a eleventh embodiment of the present invention is described with reference to FIGS. 32 and 33.

A conduit 2010 is formed at the center of the shaft 1213, and a plug 2015 is press-fitted into the right end of the conduit 2010, from which an outlet pipe 2016 extends radially outside and connects to a radiator 2080.

An intermediate frame 2005 is disposed between the engine 100 and the outer frame 1710 and accommodates therein housings 2020, 2030 and first and second gears 2060, 2070. The housing 2020 has a conduit 2025 with one end opening to the inlet port of the gear pump 9100, and the housing 2030 has a conduit 2035 connecting the outlet port of the gear pump to the conduit 2010 of the shaft 1213. The housing 2020 supports an oil seal 2040 at the left end of the intermediate frame 2005, and the housing 2030 supports an oil seal 2050 at the right end of the intermediate frame 2005. The first gear 2060 is carried by the shaft 1213 to rotate together therewith. The second gear 2070 engages the first gear 2060 to form a two-rotor-type gear pump 9100 with the first gear 2060 as shown in FIG. 33.

The engine 100 is provided with a coolant passage 9120 which connects to the other end of the conduit 2025. The coolant introduced into the coolant passage 9120 flows into the conduit 2025 and the inlet port of the gear pump 9100, which drives the coolant into the conduits 2035 and 2010 to cool the first rotor 1210. Thereafter, the coolant is sent to the radiator 2080 through the outlet pipe 2016. The coolant is cooled by the radiator 2080 and sent to the coolant passage 9120 of the engine thereafter.

When the T-S converter 9000 rotates at a constant speed, a constant amount of the coolant is supplied to the inside of the converter 9000. When the engine speed changes, the rotational speed of the gear pump 9100 changes accordingly so that the amount of the coolant is controlled according to the engine speed.

Figure 35:
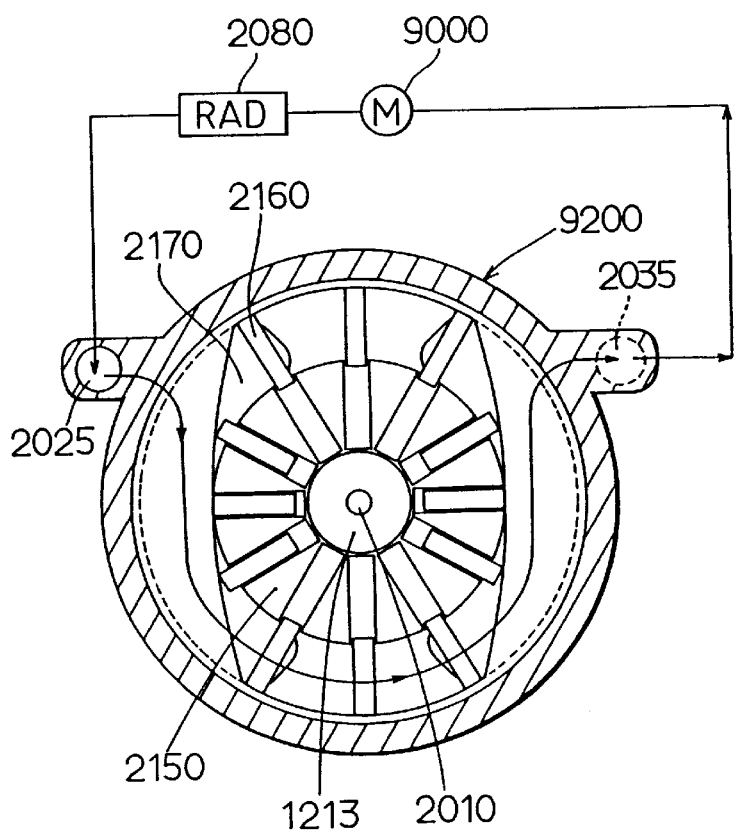
FIG. 35 is a schematic front view illustrating the pump shown in FIG. 34.
Figure 34:
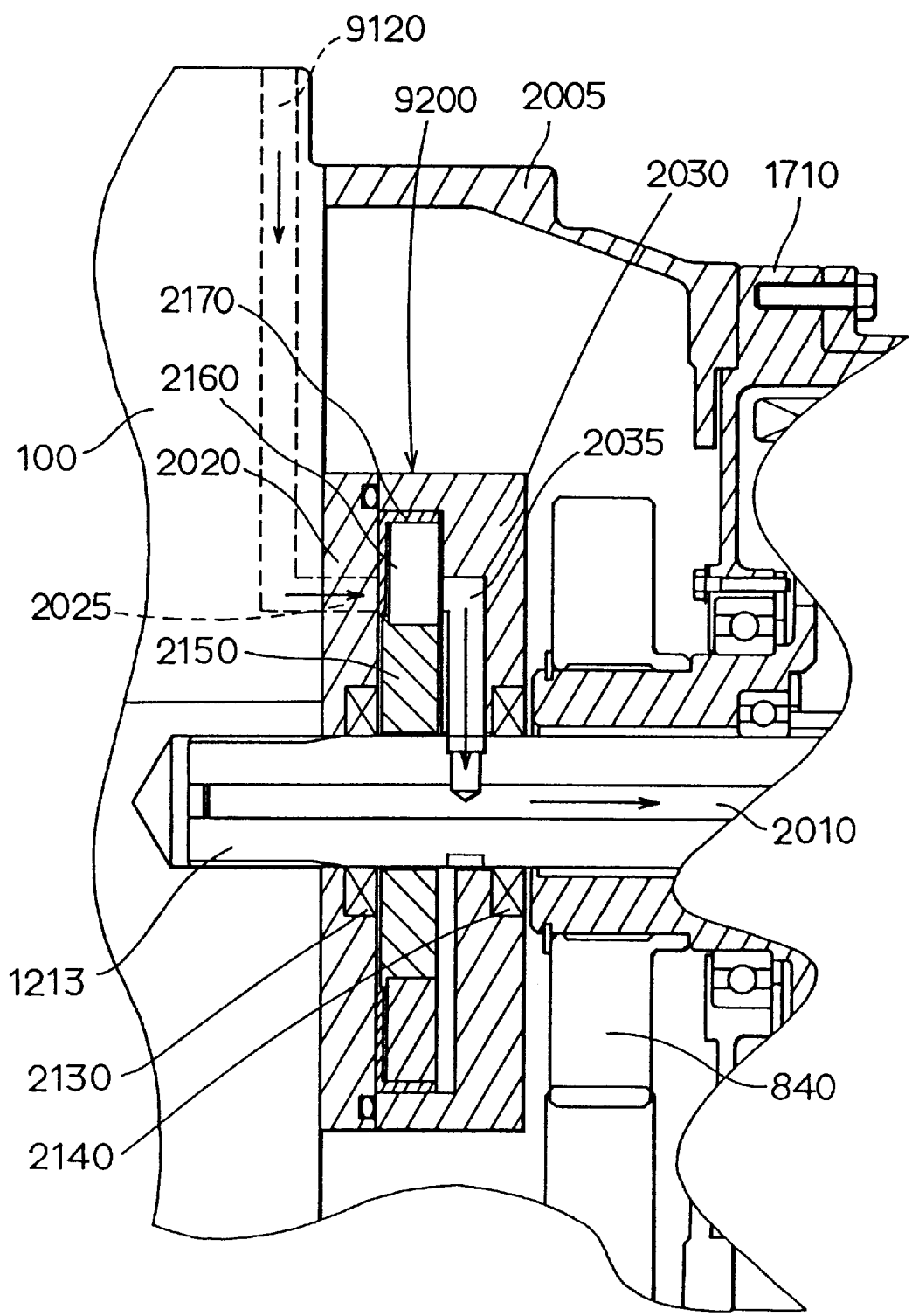
FIG. 34 is a cross-sectional side view illustrating a variation of the pump shown in FIG. 32.

A variation 9200 of the pump is described with reference to FIGS. 34 and 35.

The gear pump 9100 of the eleventh embodiment is replaced with a vane pump 9200. The vane pump 9200 is mainly composed of a pump rotor 2150, a plurality of vanes 2160 held by the pump rotor 2150, a cum ring 2170 having an inner periphery on which the edge of the vanes slides by the centrifugal force.

Figure 36:
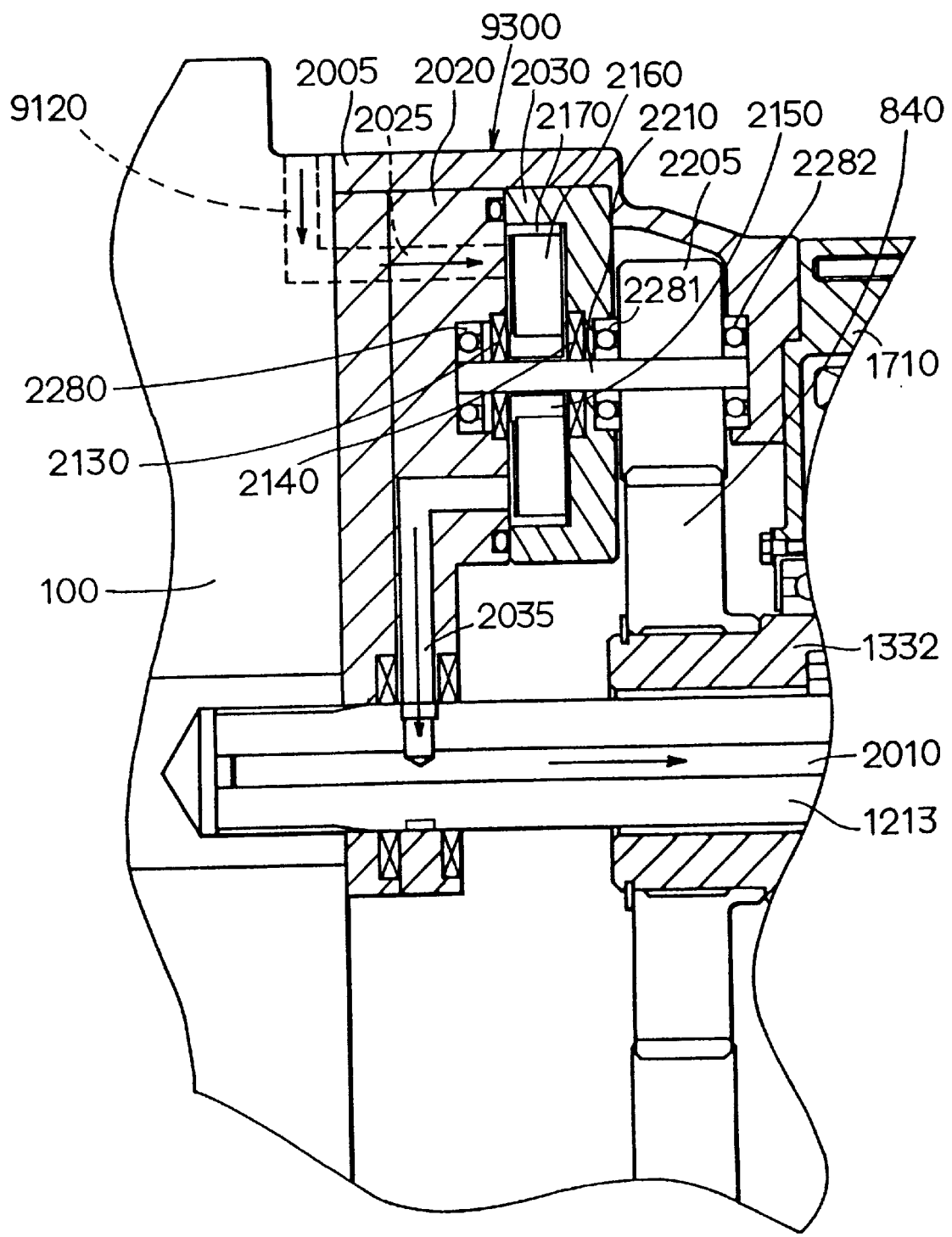
FIG. 36 is a cross-sectional side view illustrating a second variation of the pump shown in FIG. 32.

A second variation 9300 of the pump is described with reference to FIG. 36.

The gear pump 9100 of the eleventh embodiment is replaced with a vane pump 9300 which is disposed in the intermediate frame 2005 and driven by a gear 2205 in mesh with the gear 840. The gear 2205 is carried by a pin 2210 which is supported by the intermediate frame 2005 via a pair of bearings 2281 and 2282 at the opposite ends thereof. The pump rotor 2150 is carried by the same pin 2210 between a pair of the oil seals 2130 and 2140 in the same manner as the previous variations. The left end of the pin is supported by the housing 2020 via a bearing 2280.

When the rotor frame 1332 rotates, the pump rotor 2150 is rotated through the gears 840 and 2205 and the pin 2210. As a result, the coolant is sent from the coolant pipe 9120 to the conduit 2025 which connect to an inlet port of the vane pump. Then the coolant is driven by the vane pump and flows from an outlet port of the vane pump through the conduits 2026 and 2010 to the radiator 2080.

Figure 37:
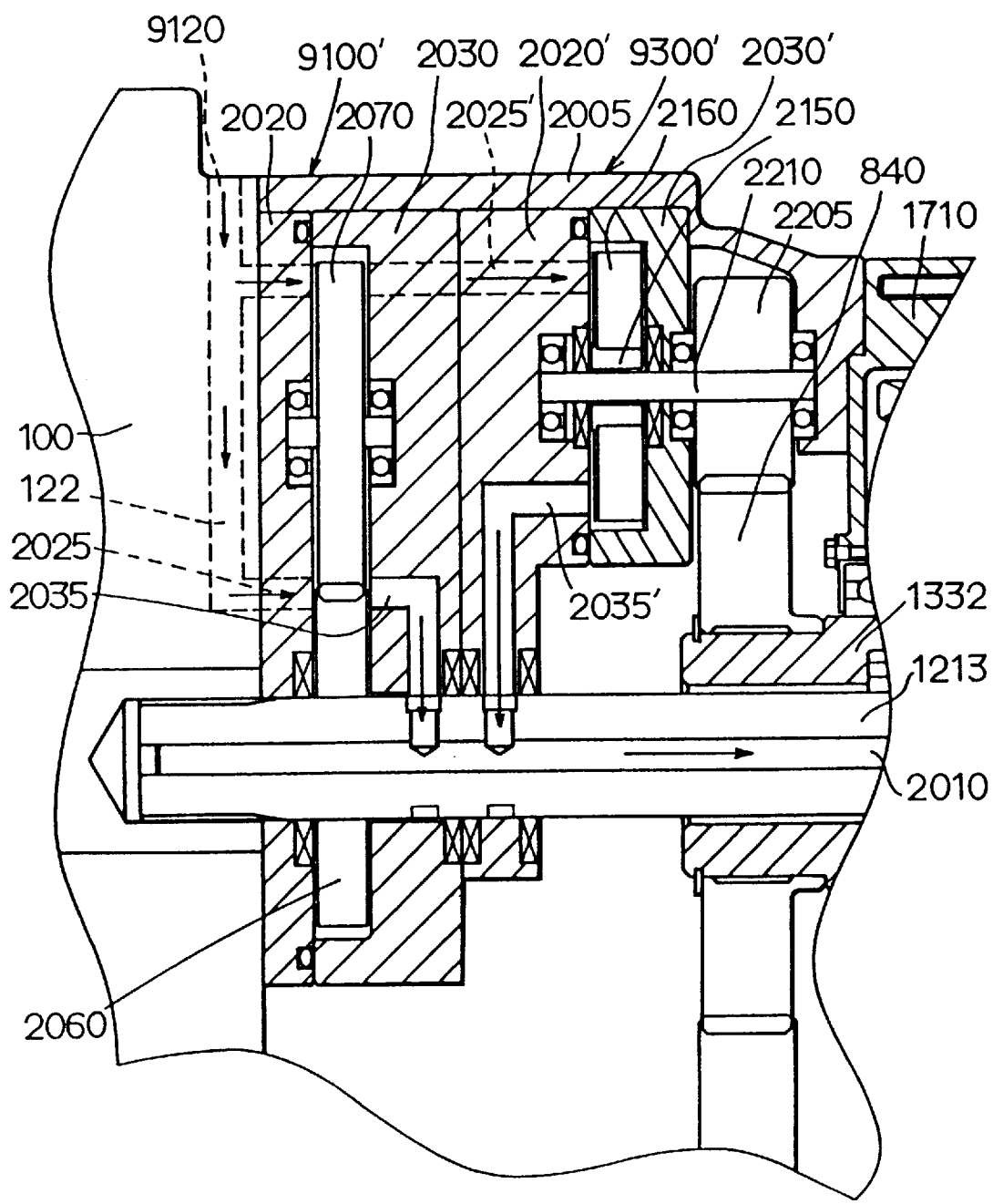
FIG. 37 is a cross-sectional side view illustrating a third variation of the pump shown in FIG. 32.

A third variation of the pump is described with reference to FIG. 37.

A gear pump 9100' and a vane pump 9300' are installed in the intermediate housing 2005. Conduits 2025' of the vane pump 9300' is formed in a housing 2020' of the vane pump 9300' and connected to the coolant passage 9120 of the engine in parallel with the conduit 2025 of the gear pump 9100', and a conduit 2035' of the vane pump 9300' is formed in the housing 20201 of the vane pump 9300' and connected to the conduit 2010 of the shaft 1213 in parallel with the conduit 2035 of the gear pump 9100'.

One of the pumps 9100' and 9300' which rotates at higher speed is operated to cool the T-S converter. Other operations are substantially the same as the gear pump 9100 of the eleventh embodiment and the vane pump of the second variation thereof.

Twelfth Embodiment

Figure 38:
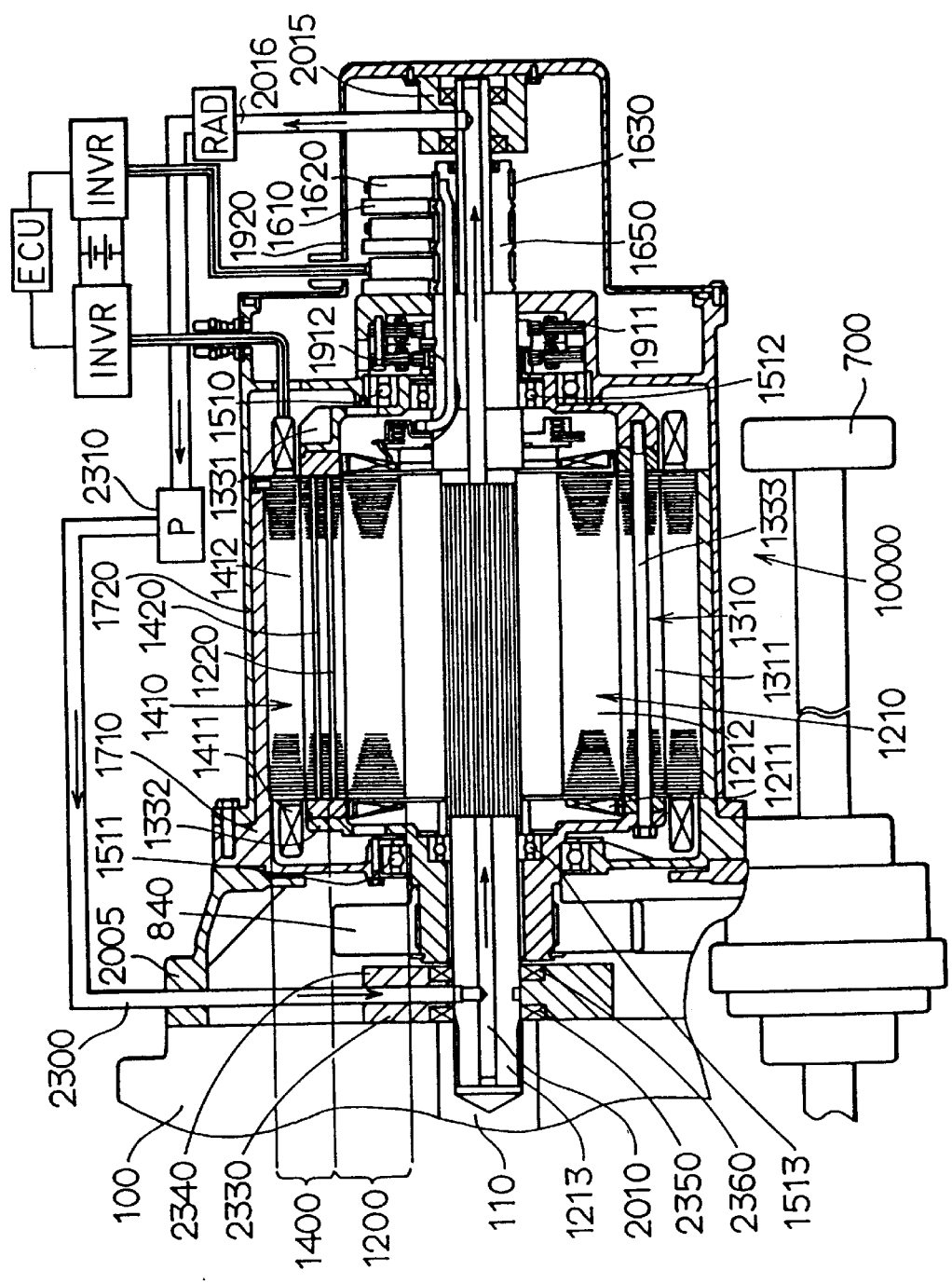
FIG. 38 is a schematic cross-sectional side view illustrating a system according to a twelfth embodiment of the present invention.

A T-S converter 10000 according to a twelfth embodiment is described with reference to FIG. 38.

A pump 2310 is disposed outside the T-S converter. The pump 2310 has an inlet port connected to the outlet pipe 2016 which is connected to the conduit 2010 at the right end of the shaft 1213 and an outlet port connected to an intake pipe 2300 which is connected to the left end of the conduit 2010 through housings 2330 and 2340. Oil seals 2250 and 2260 are inserted between the housings 2330, 2340 and the shaft 1213. The intake pipe 2300 is disposed in a space between the engine 100 and the T-S converter 10000.

Variations

Some variations of the above embodiments are described hereafter.

Figure 39:
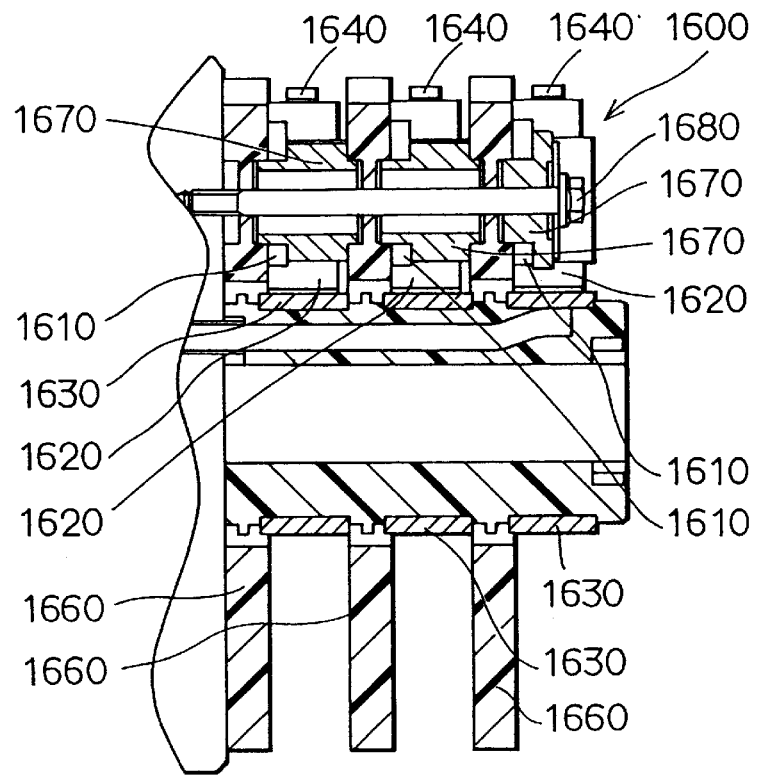
FIG. 39 is a schematic cross-sectional side view illustrating a variation of a power supply section.
Figure 40:
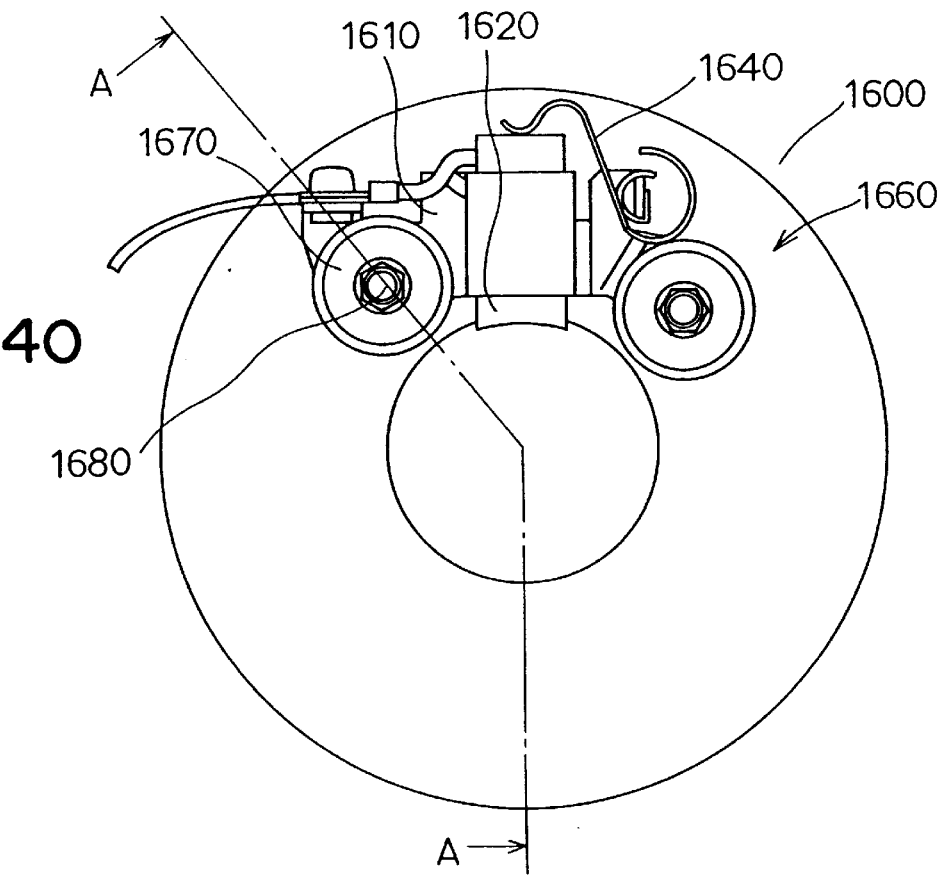
FIG. 40 is a schematic plan view illustrating the power supply section shown in FIG. 39.

A heat-dissipating arrangement of the power supply section 1600 is shown in FIGS. 39 and 40.

The power supply section 1600 is composed of three brushes and brush holders 1620 and 1610 disposed longitudinally around the input shaft 1213, springs 1640 biasing respective brushes 1620 against the slip rings 1630, insulating disk members 1660 disposed between adjacent two of the brushes 1610, heat-conductive insulating collars 1670 made of a ceramic and bolts 1680. The insulating disk members 1660 are positioned by the collars 1670, into which the bolts 1680 are inserted to fix the power supply section 1600 to the frame 1730.

The above arrangement is effective to dissipate heat generated in the brushes 1620 to the frame 1730 through the collars 1670.

Figure 41:
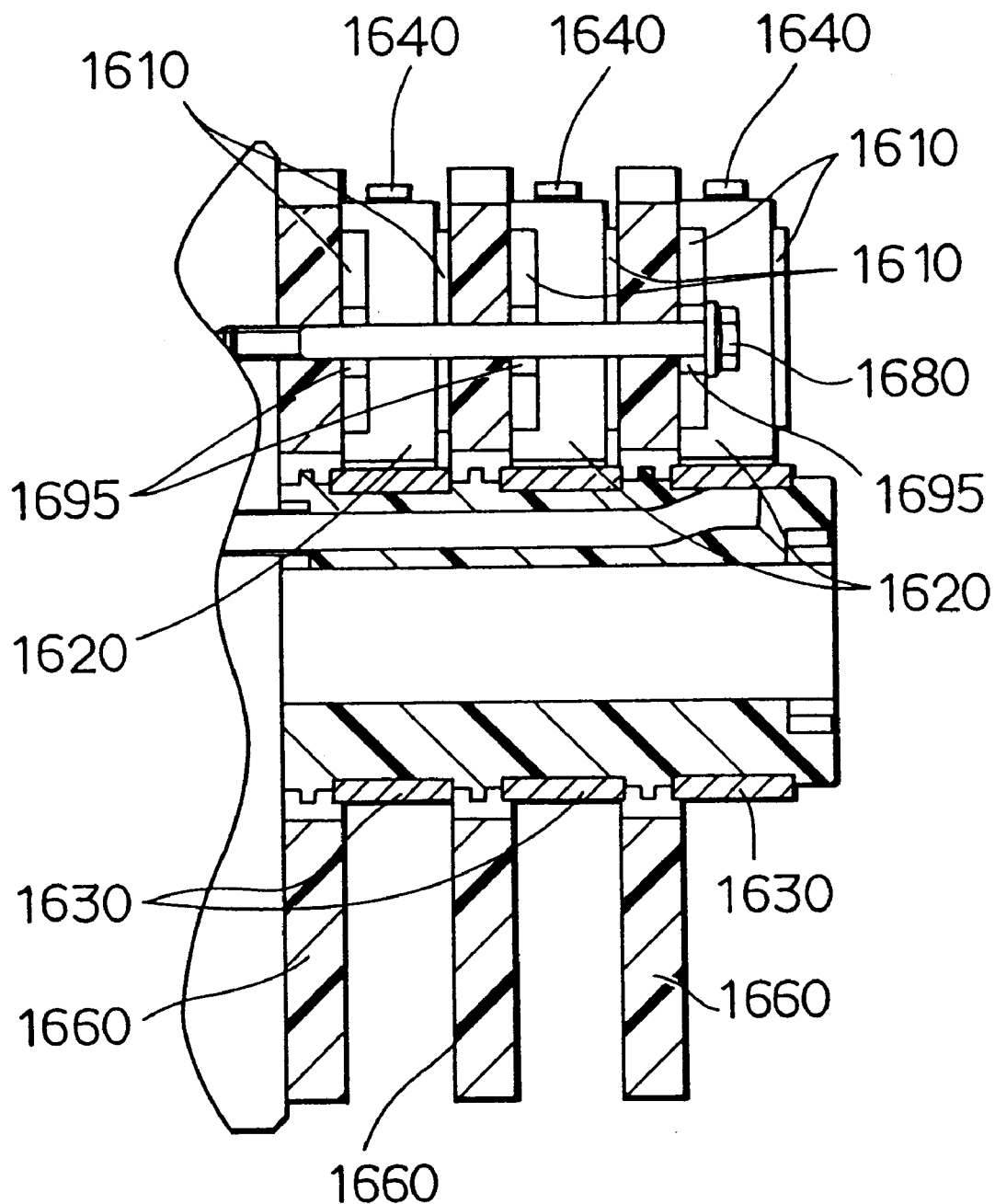
FIG. 41 is a schematic cross-sectional side view illustrating a variation of a power supply section.
Figure 42:
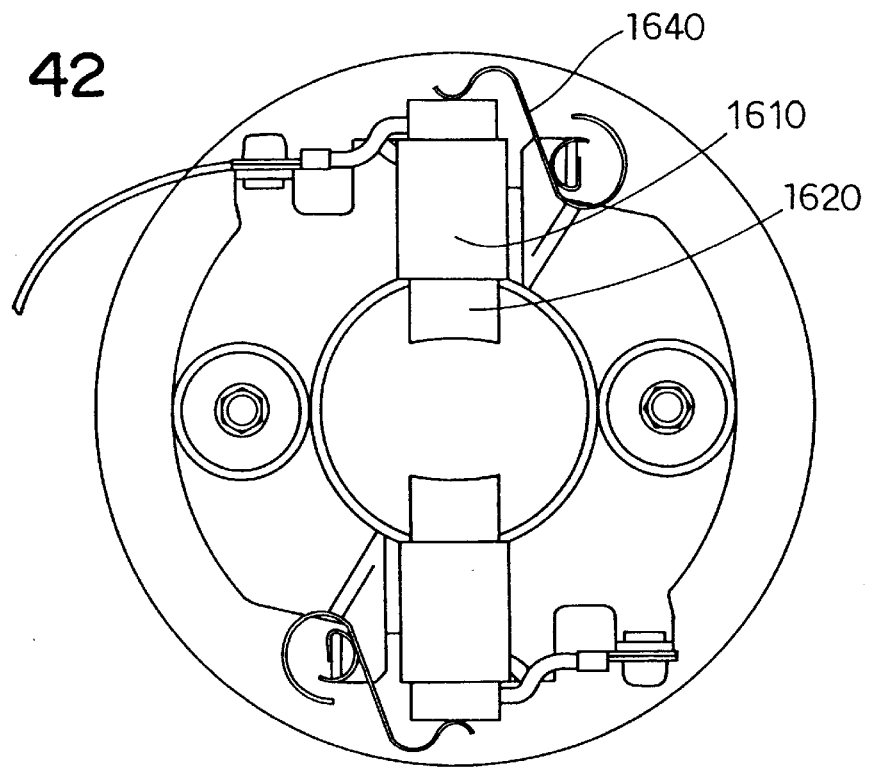
FIG. 42 is a schematic plan view illustrating the power supply section shown in FIG. 41.
Figure 43:
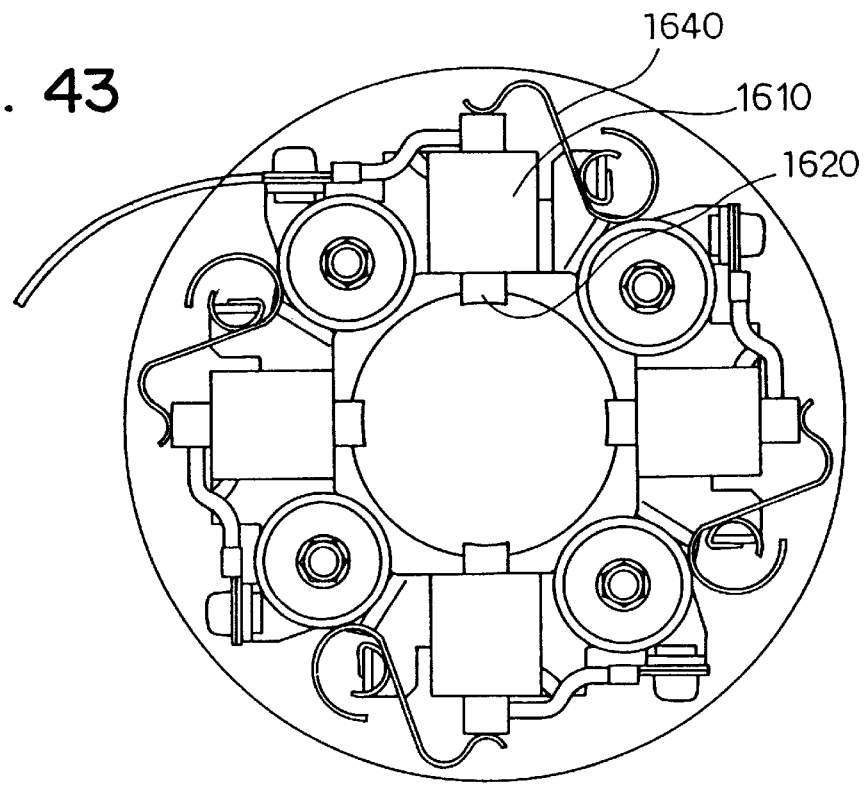
FIG. 43 is a schematic plan view illustrating a variation of the power supply section shown in FIG. 41.

Another heat-dissipating arrangement of the power supply section 1600 is shown in FIG. 41. The ceramic insulating collars 1670 are replaced with small insulating collar 1695 made of rubber so that the brush holders 1610 and the brushes 1620 are disposed in contact with the insulating disk members 1660. The insulating disk members 1660 are preferably made of heat conductive material such as ceramics. A plurality of the brushes 1620 can be used for each phase in order to reduce the density of the brush current. A pair of brushes used for each phase is shown in FIG. 42 and four brushes used for each phase is shown in FIG. 43.

Figure 44:
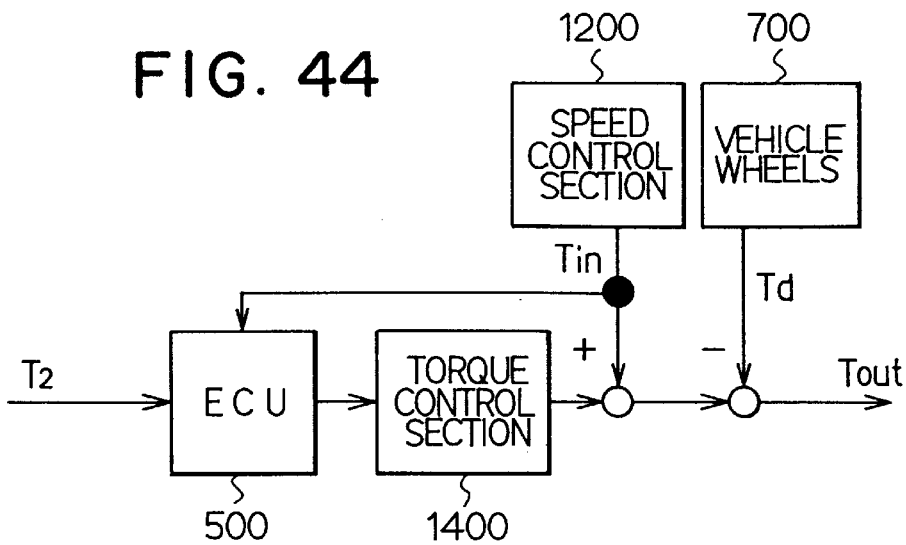
FIG. 44 is a block diagram of controlling a torque control section.
Figure 45:
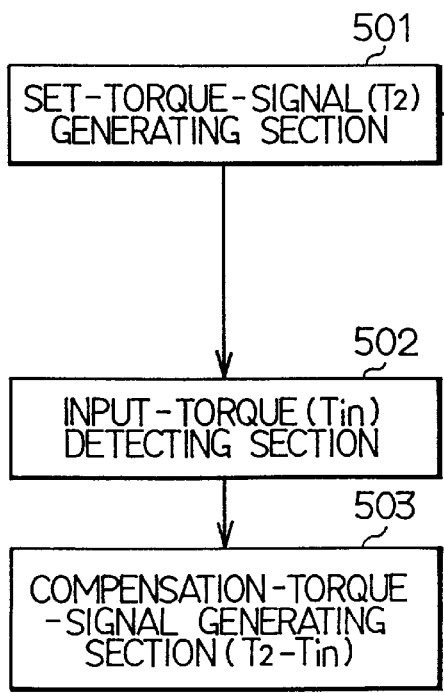
FIG. 45 is a block diagram of a part of controlling the torque control section shown in FIG. 44.

A variation of controlling the torque control section 1400 is described hereafter with reference to FIGS. 16, 44 and 45.

When a driver depresses the accelerator of a vehicle, a signal of a set torque T2 is generated according to a depressed stroke of the accelerator pedal (and the brake pedal according to circumstances) and sent to the inverter control unit (or ECU) 500 as shown in FIG. 16. The ECU 500 controls the torque control section 1400 so that the second rotor 1310 of the torque control section 1400 rotates at the set torque T2 and a desired speed without regard to an outside torque including noises Td transmitted from wheels.

For this purpose, a difference between an input torque Tin applied by the first rotor 1210 of the speed control section 1200 and the set torque T2 is taken into the ECU 500. FIG. 45 shows a set-torque-signal generating sections 501, an input-torque detecting section 502 and a compensation-torque-signal generating section 503 in the inverter control unit 500. The input-torque detecting section 502 reads or calculates the input torque Tin applied by the first rotor 1210 of the speed control section to the second rotor 1310 of the torque control section by means of a torque sensor or the like. The set-torque-signal generating section 501 generates the set-torque signal T2 by calculating the amount of depressed stroke of the accelerator or vehicle speed. The compensation-torque-signal generating section calculates a compensation torque signal from the set-torque signal T2 and the input torque signal Tin.

Accordingly, when the fuel cut control of an engine is carried out, decrease of the engine torque can be smoothly compensated by the above process. The above process is effective to other torque controls. For example, the engine can be started by the speed control section 1200 without giving shock to a driver whenever a vehicle stands still or runs.

Figure 47:
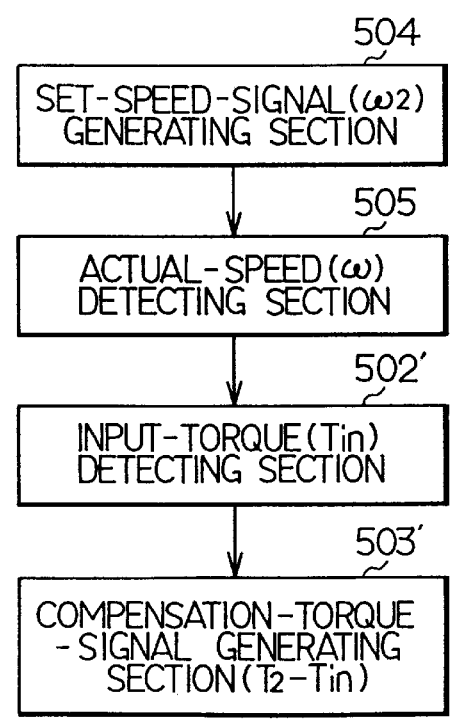
FIG. 47 is a block diagram of a part of controlling the torque control section shown in FIG. 46.
Figure 46:
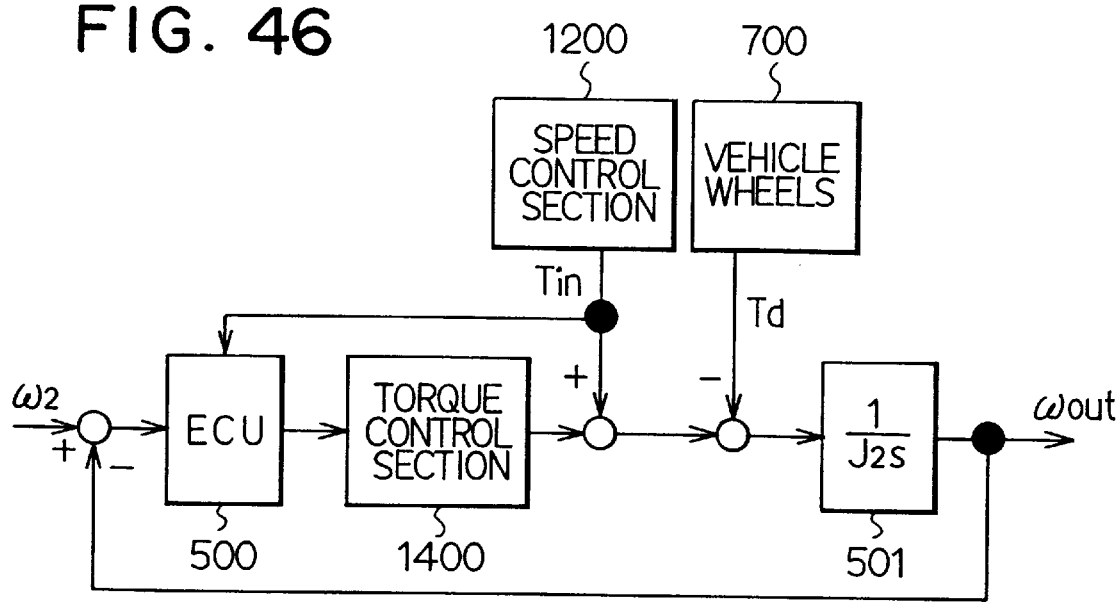
FIG. 46 is a block diagram of controlling the torque control section.

Another variation of controlling the torque control section 1400 is described hereafter with reference to FIGS. 46 and 47.

In this variation, a set rotational speed (angular speed) ω2 of the second rotor 1310 of the torque control section 1400 is controlled by detecting the actual speed of the second rotor 1310. A block 501 represents a feed forward circuit for calculating signals according to the motion of motion in Laplace transform which provides an output rotational speed ω2. When torque increases, the circuit 501 provides increased rotational speed. FIG. 47 shows a set-speed-signal generating section 504, an actual-speed detecting section 505, an input-torque detecting section 502' and a compensation-torque-signal generating section 503' in the ECU 500. The set-speed-signal generator 504 generates a set speed signal ω2 according to the depressed stroke of the accelerator pedal and other vehicle conditions; the actual-speed detecting section 505 takes in the actual rotational speed ω; the input-torque detecting section 502' detects or calculates the input torque Tin applied by the first rotor 1210 of the speed control section 1200 to the second rotor 1310 of the torque control section by means of a torque sensor or the like; and the compensation-torque signal generating section calculates the set torque T2 to the amount of depressed stroke of the accelerator and rotational speed of the second rotor 1310, and calculates a compensation-torque-signal (T2−Tin).

Figure 48:
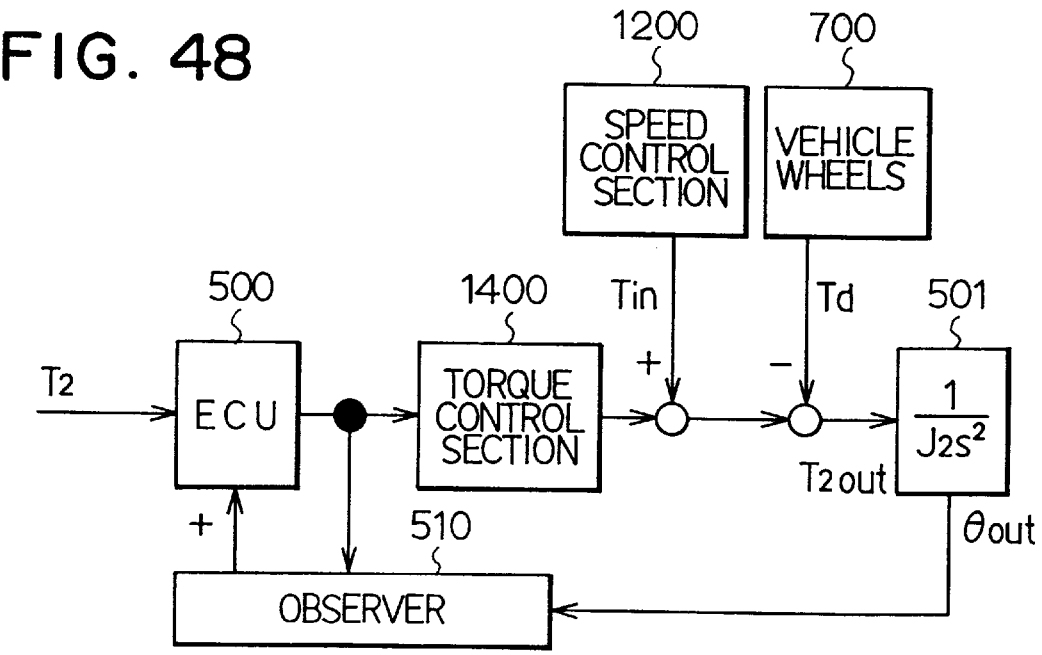
FIG. 48 is a block diagram of controlling the torque control section.

Another variation of controlling the torque control section 1400 is described hereafter with reference to FIG. 48.

In this variation, an observer 510 is provided in the control system. The observer 510 presumes torque noise according to a transfer function of the set torque T2 of the second rotor 1310 and actual rotational speed or rotational angle thereof. The torque noise can be set by a transfer function of the input current of the torque control section 1400 and the rotational speed or rotational angle of the second rotor 1310. A block 501 represents a circuit for providing the output angle θout by transforming a torue T2out which is presumed from the actual rotational angle and the set torque T2.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A system for driving an electric vehicle having a battery, an engine and a vehicle drive member comprising:

a speed-torque converter having a housing, an input shaft connected to said engine, an output shaft connected to said vehicle drive member, a first rotor having a first control coil, a stator having a second control coil, a second rotor having a first member for generating magnetic field interlinking said first control coil and a second member for generating magnetic field interlinking said second control coil;

means for detecting rotation of said first rotor and said second rotor; and means, connected to said battery, said first and second control coils and said rotation detecting means, for supplying said first and second control coils with control electric current according to said rotation of said first and second rotors to convert rotational speed and torque of said engine and drive said vehicle drive member at a set rotational speed with a set torque.

2. A system for driving an electric vehicle as claimed in claim 1, wherein said first rotor is connected to said input shaft and said second rotor is connected to said output shaft.

3. A system for driving an electric vehicle as claimed in claim 1, wherein said second rotor is connected to said input shaft and said first rotor is connected to said output shaft.

4. A system for driving an electric vehicle as claimed in claim 1, wherein said speed-torque converter further comprises a speed reduction means connected in series with said output shaft.

5. A system for driving an electric vehicle as claimed in claim 1, wherein said speed-torque converter further comprises a planetary-gear speed reduction means connected in series with said output shaft.

6. A system for driving an electric vehicle as claimed in claim 1, wherein said control current supplying means comprises means for controlling said engine to operate as a brake member when said vehicle drive member drives said output shaft.

7. A system for driving an electric vehicle as claimed in claim 1, wherein said first rotor, said second rotor and said stator are disposed coaxially with each other on a common plane.

8. A system for driving an electric vehicle as claimed in claim 1, wherein said first rotor is disposed radially inside said second rotor and said second rotor is disposed radially inside said stator coaxially.

9. A system for driving an electric vehicle as claimed in claim 1, wherein at least one of said first and second members comprises permanent magnets.

10. A system for driving an electric vehicle as claimed in claim 1, wherein at least one of said first and second members comprises a squirrel cage conductor.

11. A system for driving an electric vehicle as claimed in claim 1, wherein said first and second members comprise squirrel cage conductors and said second rotor comprises a nonmagnetic member disposed between said first and second members.

12. A system for driving an electric vehicle as claimed in claim 1, wherein said control electric current supplying means comprises a first inverter connected to said first control coil, a second inverter connected to said second control coil and an inverter control unit connected to said rotation detecting means and to said first and second inverters for controlling timing of said control electric current supplied to said first and second control coils by said inverters according to rotation of said first and second rotors.

13. A system for driving an electric vehicle as claimed in claim 12, wherein said input shaft and said output shaft are disposed at same side of said housing.

14. A system for driving an electric vehicle as claimed in claim 13, wherein said input shaft and said output shaft are disposed coaxially with each other.

15. A system for driving an electric vehicle as claimed in claim 14, wherein said rotation detecting means is disposed in said housing remote from said input shaft and said output shaft.

16. A system for driving an electric vehicle as claimed in claim as claim 15, wherein said control electric current supplying means comprises brushes and slip rings disposed in said housing remote from said input shaft and said output shaft.

17. A system for driving an electric vehicle as claimed in claim 16, wherein said speed-torque converter further comprises a speed reduction means connected in series with said output shaft.

18. A system for driving an electric vehicle having a battery, an engine and vehicle differential gears comprising:
  a speed-torque converter having a housing, an input shaft disposed in said housing and connected to said engine at a side, an output shaft disposed coaxially with said input shaft and connected to said vehicle differential gears at the same side, a first rotor having a first control coil, a stator having a second control coil, a second rotor having a first member for generating magnetic field interlinking said first control coil and a second member for generating magnetic field interlinking said second control coil;
  means for detecting rotation of said first rotor and said second rotor; and
  means, connected to said battery, said first and second control coils and said rotation detecting means, for supplying said first and second control coils with control electric current according to said rotation of said first and second rotors to convert rotational speed and torque of said engine and drive said vehicle at a set rotational speed with a set torque, last said means comprising means for controlling said engine to operate as a brake member when said vehicle drive member drives said output shaft.

19. A system for driving an electric vehicle as claimed in claim 18, wherein said rotation detecting means is disposed in said housing remote from said input shaft and said output shaft.

20. A system for driving an electric vehicle as claimed in claim as claim 18, wherein said control electric current supplying means comprises brushes and slip rings disposed in said housing remote from said input shaft and said output shaft.

21. A system for driving an electric vehicle as claimed in claim 18, wherein said control electric current supplying means comprises means for generating battery charging current.

22. A system for driving an electric vehicle having a battery, an engine and a vehicle drive member comprising:
  a speed-torque converter having a housing, an input shaft connected to said engine, an output shaft connected to said vehicle drive member, a first rotor having a first control coil, a stator having a second control coil, a second rotor having a first member for generating magnetic field interlinking said first control coil through a magnetic path and a second member for generating magnetic field interlinking said second control coil through the same magnetic path;
  means for detecting rotation of said first rotor and said second rotor; and
  means, connected to said battery, said first and second control coils and said rotation detecting means, for supplying said first and second control coils with control electric current according to said rotation of said first and second rotors to convert rotational speed and torque of said engine and drive said vehicle drive member at a set rotational speed with a set torque.

23. A system for driving an electric vehicle as claimed in claim 22, wherein said first member comprises a number of magnetic poles and said second member comprises the same number of the magnetic poles.

24. A system for driving an electric vehicle as claimed in claim 22, wherein said second rotor comprises a laminated core having a plurality of holes for accommodating said first and second members therein.

25. A system for driving an electric vehicle having a battery, an engine and a vehicle drive member comprising:

a first electromagnetic rotary unit having an input shaft connected to said engine, a first rotor connected to said input shaft and having a first control coil, a first member for generating magnetic field interlinking said first control coil;

a second electromagnetic rotary unit having an output shaft connected to said vehicle drive member, a stator having a second control coil and a second rotor connected to said output shaft and having a second member for generating magnetic field interlinking said second control coil, said second rotor being fixed to said first member ;

means for detecting rotation of said first rotor and said second rotor; and means, connected to said batter y, said first and second control coils and said rotation detecting means, for supplying said first and second control coils with control electric current according to said rotation of said first and second rotors to convert rotational speed and torque of said engine and drive said vehicle drive member at a set rotational speed with a set torque.

26. A system for driving an electric vehicle as claimed in claim 25, wherein said first and second control coils comprise respectively three phase windings.

27. A system for driving an electric vehicle as claimed in claim 26, wherein said first and second members comprise respectively permanent magnets.

28. A system for driving an electric vehicle as claimed in claim 26, wherein at least one of said first and second members comprises a squirrel cage conductor.

29. A system for driving a vehicle having a battery, an engine and a vehicle-wheel drive member comprising:

a housing;

a rotary electric machine, disposed in said housing and including an input shaft connected to said engine, an output shaft connected to said vehicle-wheel drive member, a first rotor having a first control coil, a stator having a second control coil, and a second rotor having a first member for generating magnetic field interlinking said first control coil and a second member for generating magnetic field interlinking said second control coil;

means for detecting rotation of said first rotor and said second rotor;

means, connected to said first and second control coils, for supplying said first and second control coils with electric power according to said rotation of said first and second rotors to convert rotational speed and torque of said engine and drive said vehicle drive member at a set rotational speed with a set torque; and means for supplying coolant to inside of said rotary electric machine.

30. A system for driving a vehicle as claimed in claim 29, wherein coolant supplying means is disposed near said electric power supplying means.

31. A system for driving a vehicle as claimed in claim 29, wherein said coolant supplying means comprises a conduit disposed in one of said input and output shafts, coolant passage and a plug member connecting said coolant passage and said conduit.

32. A system for driving a vehicle as claimed in claim 31, wherein said coolant passage is disposed between said housing and said plug member.

33. A system for driving a vehicle as claimed in claim 32, wherein said coolant supplying means further comprises a pair of oil seals disposed between said plug member and said one shaft and an annular groove disposed between said oil seals.

34. A system for driving a vehicle as claimed in claim 33, wherein said coolant supplying means further comprises a coolant return passage and an additional annular groove in parallel with the former annular groove to connect to said coolant return passage.

35. A system for driving a vehicle as claimed in claim 34, wherein said plug member is disposed near said electric power supplying means.

36. A system for driving a vehicle as claimed in claim 29, said coolant passage is disposed in said first rotor and opens at an end of said first rotor.

37. A system for driving a vehicle having a battery, an engine and a vehicle-wheel drive member comprising:

a housing;

a rotary electric machine, disposed in said housing and including an input shaft connected to said engine, an output shaft connected to said vehicle-wheel drive member, a first rotor connected to said input shaft and having a first control coil, a stator having a second control coil, and a second rotor connected to said output shaft and having a first member for generating magnetic field interlinking said first control coil and a second member for generating magnetic field interlinking said second control coil;

means, disposed in said housing, for detecting rotation of said first rotor and said second rotor;

means, connected to said first and second control coils, for supplying said first and second control coils with electric power according to said rotation of said first and second rotors to convert rotational speed and torque of said engine and drive said vehicle drive member at a set rotational speed with a set torque; and means for supplying coolant to inside of said rotary electric machine; wherein said first rotor, stator and second rotor are disposed coaxially with one another.

38. A system for driving a vehicle as claimed in claim 37, wherein said coolant supplying means comprises a conduit disposed longitudinally in said input shaft and a coolant passage disposed in said first rotor and connected to last said conduit.

39. A system for driving a vehicle as claimed in claim 38, wherein said coolant supplying means further comprises an intake pipe disposed in said conduit, thereby forming said conduit into a return passage.

40. A system for driving a vehicle as claimed in claim 39 wherein said electric power supplying means comprises a first inverter connected between said battery and said first control coil and a second inverter connected between said battery and said second control coil.

41. A system for driving a vehicle as claimed in claim 38, wherein said first rotor comprises a plurality of laminated iron core having a hole forming said coolant passage.

42. A system for driving a vehicle as claimed in claim 38, wherein said coolant passage comprises a pipe disposed in said first rotor.

43. A system for driving a vehicle as claimed in claim 38, said coolant passage is disposed near said first control coil.

44. A system for driving a vehicle as claimed in claim 38, said first rotor has a plurality of slots for accommodating said first coil and said coolant passage comprises as many branch passages as said slots.

45. A system for driving a vehicle as claimed in claim 44, wherein every other of said branch passages has an opening connecting to said first control coil.

46. A system for driving a vehicle as claimed in claim 45, wherein said branch passages are disposed circumferentially.

47. A system for driving a vehicle having a battery, an engine and a vehicle-wheel drive member comprising:
- a housing;
- a rotary electric machine disposed in said housing and including a first rotor having an input shaft connectable to said engine, a rotor core carried by said input shaft and a first control coil disposed in said core, a stator having a stator core and a second control coil disposed in said stator core and a second rotor having an output shaft connectable to said vehicle-wheel drive member, a rotary yoke carried by said output shaft, a plurality of first permanent magnets disposed on a side of said first control coil and a plurality of second permanent magnets disposed on a side of said second control coil;
- means, disposed in said housing, for detecting rotation of said first rotor and said second rotor;
- means, connected to said first and second control coils, for supplying said first and second control coils with electric power according to said rotation of said first and second rotors to convert rotational speed and torque of said engine and drive said vehicle drive member at a set rotational speed with a set torque; and
- means for supplying coolant to inside of said rotary electric machine.

48. A system for driving a vehicle as claimed in claim 47, wherein said coolant supplying means comprises a first coolant passage connected between a coolant inlet and said first control coil and a second coolant passage connected between said first control coil and said second control coil.

49. A system for driving a vehicle as claimed in claim 48, wherein said first coolant passage comprises a conduit disposed in said shaft, a conduit disposed in said rotor core and an opening disposed near said first control coil.

50. A system for driving a vehicle as claimed in claim 49, wherein said second coolant passage comprises a slit disposed in said rotary yoke.

51. A system for driving a vehicle as claimed in claim 50, wherein said rotary yoke comprises a plurality of iron sheets and said slit comprises an internal slit disposed in one of said sheets and an external slit disposed in another sheet adjacent to said one sheet and wherein said internal slit has one end open to said first control coil and the other end, and said external slit has one end open to said second control coil and the other end connected to the other end of said internal slit.

52. A system for driving a vehicle as claimed in claim 50, wherein said internal slit is disposed between adjacent two of said first permanent magnets and said external slit is disposed between adjacent two of said second permanent magnets.

53. A system for driving a vehicle as claimed in claim 51, wherein said rotary yoke has a plurality of fastening bolts for securing said rotary yoke to said housing, and each of said internal and external slits has C-shaped groove around one of said fastening bolt.

54. A system for driving a vehicle as claimed in claim 51, wherein each of said iron sheets has said internal slit and external slit.

55. A system for driving a vehicle as claimed in claim 47, wherein said coolant supplying means comprises a coolant outlet connected to an outside coolant reservoir, a first coolant passage having one end connected to said coolant outlet for cooling said first control coil and a pump connected to the other end of said first coolant passage for supplying coolant to said first coolant passage.

56. A system for driving a vehicle as claimed in claim 55, wherein
said first coolant passage is disposed in said input shaft.

57. A system for driving a vehicle as claimed in claim 56, wherein said pump is disposed in said housing and driven by one of said input and output shafts.

58. A system for driving a vehicle as claimed in claim 48, wherein said pump is driven by said input shaft, and said coolant supplying means further comprises another pump driven by said output shaft and connected in parallel with said former pump.

59. A system for driving a vehicle as claimed in claim 55, wherein said coolant reservoir comprises a radiator.

60. A system for driving a vehicle having a battery, an engine and a vehicle-wheel drive member comprising:
- a housing;
- a rotary electric machine disposed in said housing and including a first rotor having an input shaft connectable to said engine, a rotor core carried by said input shaft and a first control coil disposed in said core, a stator having a stator core and a second control coil disposed in said stator core and a second rotor having an output shaft connectable to said vehicle-wheel drive member, a rotary yoke carried by said output shaft, a plurality of first permanent magnets disposed on a side of said first control coil and a plurality of second permanent magnets disposed on a side of said second control coil;
- means, disposed in said housing, for detecting rotation of said first rotor and said second rotor; and
- means, connected to said first and second control coils, for supplying said first and second control coils with electric power according to said rotation of said first and second rotors to convert rotational speed and torque of said engine and drive said vehicle drive member at a set rotational speed with a set torque; wherein
- said means for supplying electric power comprises a power supply section disposed between said input shaft and housing,
- said power supply section is composed of a plurality of brushes disposed longitudinally around said input shaft, insulating members disposed respectively between said brushes and fixed to said housing and slip rings fixed to said input shaft to be in contact with said brushes, and
- said insulating members and said brushes are disposed in a heat dissipating passage connected to said housing.

61. A system for driving a vehicle as claimed in claim 60, wherein said power supply section is further composed of brush holders disposed in contact with said insulating members.

62. A system for driving a vehicle claimed in claim 60, wherein said insulating members are made of heat conductive ceramics.

63. A system for driving a vehicle claimed in claim 60, wherein said power supply section is further composed of collars and bolts for positioning said insulating members in said housing, and
said collars are disposed in said heat dissipating passage.

64. A system for driving a vehicle having a battery, an engine and a vehicle-wheel drive member comprising:
- a housing;
- a rotary electric machine disposed in said housing and including a first rotor having an input shaft connectable to said engine, a rotor core carried by said input shaft and a first control coil disposed in said core, a stator having a stator core and a second control coil disposed in said stator core and a second rotor having an output shaft connectable to said vehicle-wheel drive member, a rotary yoke carried by said output shaft, a plurality of first permanent magnets disposed on a side of said first control coil and a plurality of second permanent magnets disposed on a side of said second control coil;

means, disposed in said housing, for detecting rotation of said first rotor and said second rotor; and means, connected to said first and second control coils, for supplying said first and second control coils with electric power according to said rotation of said first and second rotors to convert rotational speed and torque of said engine and drive said vehicle drive member at a set rotational speed with a set torque; wherein said means for supplying said first and second control coils with electric power comprises a set-torque-signal generating section for generating a set torque signal according to a vehicle condition, an input-torque detecting section for calculating an input torque of said second rotor, and a compensation torque signal generating section for generating a compensation-torque signal according to said set torque signal and said input torque detected by said input-torque detecting section.

65. A system for driving a vehicle claimed in claim 64, wherein said vehicle condition includes a depressed stroke of a vehicle accelerator.

66. A system for driving a vehicle claimed in claim 64, wherein said vehicle condition includes a difference between an actual torque calculated from rotational speed of said second rotor and said set torque.

67. A system for driving a vehicle claimed in claim 64, wherein said input-torque detecting section calculates an input torque of said second rotor from an engine torque and output torque of said first motor.

68. A method for driving a vehicle having a battery, an engine, a vehicle drive member, a first electromagnetic rotary unit having a first control coil and an input shaft connected to said engine, a second electromagnetic rotary unit having a second control coil and an output shaft connected to said vehicle drive member, said method comprising steps of;

calculating a set torque Tv and set angular speed xv of said vehicle drive member;

detecting output torque Te and angular speed $\omega e$ of said engine;

supplying said first and second control coils with control electric current according to differences between said torques Tv and Te and between said angular speeds $\omega v$ and $\omega e$ thereby to convert torque Te and angular speed $\omega e$ of said engine and drive said vehicle drive member at said set torque Tv and set angular speed.

69. A method for driving a vehicle as claimed in claim 68 further comprising a step of supplying said first and second control coils with control electric current to generate battery charging current when said angular speed $\omega e$ of said engine is higher than said set angular speed $\omega v$ and said output torque Te of said engine is larger than said set torque Tv.

70. A method for driving a vehicle as claimed in claim 68 further comprising a step of supplying said first and second control coils with control electric current to generate driving torque when said angular speed $\omega e$ of said engine is lower than said set angular speed $\omega v$ and said output torque Te of said engine is lower than said set torque Tv.

71. A method for driving a vehicle as claimed in claim 68 further comprising a step of supplying said first and second control coils with control electric current to connect said vehicle drive member to said engine as a load when said angular speed $\omega e$ of said engine is lower than said set angular speed $\omega v$ and said output torque Te of said engine is smaller than said set torque Tv.

* * * * *